(12) United States Patent
Burtsev et al.

(10) Patent No.: US 6,370,634 B1
(45) Date of Patent: Apr. 9, 2002

(54) DATA FLOW COMPUTER WITH TWO SWITCHES

(76) Inventors: Vsevolod Sergeevich Burtsev, 49, 4, Gubkina str., Moscow, 117333 (RU); Igor K. Khailov, 79, 39, Ostrovitjanova str., Moscow, 117914 (RU); Eduard V. Sizko, 502, 16/2, Zadonsky proezd, Moscow, 119666 (RU); Vladimir K. Erschov, 66, 1, Glavmosstoia str., Moscow, 119619 (RU); Lev A. Koslov, 53, 22/24, Loenaja str., Moscow, 124047 (RU); Vladimir P. Torchigan, 257, 82, Leninsky pr., Moscow, 117421 (RU); Vjacheslav B. Flodorov, 113, 95/2, Vernadskogo pr., Moscow, 117296 (RU); Julia N. Nikolskaja, 138, 13, Leninsky pr., Moscow, 117071 (RU); Mikhail Vladimirovich Tverdokhlebov, 10, 52, Lavochkina str., Moscow (RU); Mikhail Jurievich Nikitin, 319, 97, Profisojuznaja str., 117269 Moscow (RU); Dmitry Borisovich Podshivalov, 113, 95/2, Vernadskogo pr., Moscow, 117296 (RU); Alexandr Mikhailovich Berezko, 200, 95/2, Vernadskogo pr., Moscow, 117391 (RU)

( * ) Notice: Subject to any disclaimer, the term of this patent is extended or adjusted under 35 U.S.C. 154(b) by 0 days.

(21) Appl. No.: 09/099,476

(22) Filed: Jun. 18, 1998

Related U.S. Application Data

(63) Continuation-in-part of application No. PCT/RU96/00347, filed on Dec. 16, 1996.

(30) Foreign Application Priority Data

Dec. 22, 1995 (RU) .......................................... 95121508

(51) Int. Cl.[7] .......................................... G06F 15/16
(52) U.S. Cl. .......................................... 712/10
(58) Field of Search ...................... 712/1, 10

(56) References Cited

U.S. PATENT DOCUMENTS

| 5,499,204 | A | * | 3/1996 | Barrera et al. | 712/215 |
| 5,649,144 | A | * | 7/1997 | Gostin et al. | 712/6 |
| 5,784,630 | A | * | 7/1998 | Saito et al. | 712/30 |

* cited by examiner

Primary Examiner—David Y. Eng
(74) Attorney, Agent, or Firm—John G. Costa

(57) ABSTRACT

A computing system for effecting scientific and technical calculations comprises at least a group of processor modules (1-1 . . . 1-N), a switch (2), an auxiliary switch (3), a group of associative memory modules (4-1 . . . 4-N), a buffering block (5). The computing system provides information processing without any inter-processor exchange, hence, decreasing the time for program processing.

4 Claims, 36 Drawing Sheets

| CC | | | | | | | A1 | A2 |
|---|---|---|---|---|---|---|---|---|
| COP | K | G | T | H | Φ | | | |
| | | | | | HΦ | HI | | |

Figure 35

DATA FLOW COMPUTER WITH TWO SWITCHES

This application is a continuation in part of International Application Number PCT/RU96/00347, filed Dec. 16, 1996, which claims priority of application 95121508RU filed on Dec. 22, 1995.

BACKGROUND OF THE INVENTION

1. Field of the Invention

The invention relates to computer technology, particularly it concerns computer systems.

The invention has application in both engineering and technical calculations for space and aviation technologies, geodesy, hydrometeorology and other fields which require high performance computations.

2. Description of the Related Art

There is a known computer system which contains central input-output processors, a switch, a main memory unit, a control panel, peripheral memory devices with control blocks and data transmission processors (SU, A, 692400).

In this system Von Neumann's principle of data processing is used. Every central processor contains a conforming (conjugating) unit, a block for performing procedures, an indexing block, a block for value retrieving, a block for processing strings, an arithmetic-logical unit, a block of the basic registers, a unit for instructions forming, a control unit, a unit for the distribution of stack addresses, a buffering stack of operands, an associative memory unit, a unit for transformation of the mathematical addresses into the physical ones, a block of memory for buffering instructions, a block for analysis of interrupts.

The arithmetic-logical unit includes: blocks for multiplication, addition, division, code transformation and logical operation performing. These blocks work in parallel and independently from one another, providing parallel data processing within each processor and using the natural parallelism of the programs under execution.

However, implementation of this unit has shown that, in practice, the use of Von Neumann's principle of computation organization requires high unproductive expenditures of hardware and computing capacity to provide parallel work of several executive devices. These expenditures, first of all, are related to the fact that to form independent sequences of instructions from the program in execution it is necessary to do a preliminary survey of program segments (of the average length up to 30 instructions) and a dynamic planning of executing units loading with the help of special hardware means, which was described in detail (Babayan B.A. "Main results and perspective of development of the "Elbrus" architecture", Applied Computer Science works collection, vol. 15, Moscow, Finance and Statistics, 1989, pp. 100–131).

Due to this fact the hardware becomes considerably more complicated, having simultaneously a low real increase of performance. Parallelism of program processing on several executive devices is restricted and does not spread on the whole program (the segments of parallel processing do not exceed 10–20 instructions). Moreover, the process of extraction of instructions from the program for parallel execution itself requires a large amount of additional hardware and working time of the processor. This is another factor of the decrease in performance.

There is a known device which contains units of common memory, units of central input-output processors, using Von Neumann's principle of computation processing and parallel work of several executive devices, being parts of central processors. This device achieves program processing parallelism by means of forming an extensive instruction which includes operations for the simultaneous start of several arithmetic units (SU, A, 1777148).

Formation of such an instruction is conducted by static operation planning during the program translation stage. Here, the number of operations of the instruction being executed in parallel is limited (it does not exceed 7).

However, this device does not achieve high performance based on the internal parallelism of the programs in execution because of limited parallelism of operations in execution in the device and a cessation of execution when all the operands necessary for a computation are not available. This problem arises from the restrictions set by the translator and also in the case when the variable position in memory depends on computation conditions. Also, this device has a complicated translator structure and a large amount of the hardware to conduct local parallelism of computation.

There is a known computer system which contains a switch and N processor units. In such a system the first control outputs and address outputs of the i-th processor unit (i=1, . . . ,N) are connected correspondingly with the i-th input of the first control input group and with the i-th input of the group of the address switch inputs. The first and second informational outputs of the i-th processor unit are connected with the corresponding i-th input of the group of informational switch inputs. The first informational, address, control and the second informational, address, control inputs of the i-th processor unit are connected with the first and second informational system inputs. The first control input of this system is connected with the control switch input and with the third control input of the i-th processor unit. The switch control output is connected with the fourth control input of the i-th processor unit. The third informational output of this unit is connected with the first informational output of the system. The computer system can have a second informational output and a third informational input (U.S. Pat. No. 4,814,978).

For computation organization this system uses the data flow principle, which provides effective loading for each processor unit and high total performance. This is achieved by means of parallel instruction execution in all sections of the program and is supported by a programmable computation organization. The program is mapped as a graph, each node of which is an instruction and arcs show the direction of data transmission. Each of the processor units, mutually connected through the switch, executes a local section of the program. The processor units work in parallel and the necessary synchronization between sections of the program is carried out by means of the data transmit through the switch. Parallelism is achieved by the partition of the program during translation into separate linked sections, which leads to a waste of time and adecrease in device performance. Thus, device performance depends greatly on the programming system capability to segregate sections (sub-programs), which are weakly linked to one another. in the original program and is quite time-consuming on the user (programmer) side.

These disadvantages do not allow the full internal parallelism of the programs in execution to be realized in this device and as a result do not achieve high performance based on this parallelism and the data flow principle.

SUMMARY OF THE INVENTION

The invention is based on the problem of creating a computer system which would achieve increased performance by means of simultaneous access of each processor unit to the entire program in execution and through automation of the process of computational means distribution.

The problem is solved this way. The computer system contains a switch, N processor units, a second informational output and a third informational input. The first control output and address output of the i-th processor unit (i=1 ... N) are connected correspondingly with the i-th input of the first group of switch control inputs and with the i-th input of the group of switch address inputs. The first and second informational outputs of the i-th processor unit are connected with the corresponding input of the group of switch informational inputs. The first informational, address, and control inputs and the second informational, address, and control inputs of the i-th processor unit are connected with the first and second informational inputs of the system. The first control input of the system is connected with the control input of the switch and with third control input of the i-th processor unit. The control output of the switch 2 is connected with the fourth control input of the i-th processor unit. The third informational output of the i-th processor unit is connected with the first informational output of the system.

According to the invention,

1. The computer system contains an auxiliary switch, N modules of associative memory and a buffering block. The first control, first informational, second control and second informational outputs of the i-th group of exchange outputs of the auxiliary switch are connected correspondingly with the fifth control, third informational, sixth control and fourth informational inputs of the i-th processor unit. The first group of control outputs of the auxiliary switch is connected with the first group of control inputs of the buffering block. The second group of control outputs of the auxiliary switch is connected with the second group of control inputs of the buffering block. The control inputs of the auxiliary switch and of the buffering block and the first control input of each module of associative memory are connected with the control input of the system. The i-th inputs of the first and second groups of control inputs of the auxiliary switch are connected correspondingly with the second and third control outputs of the i-th processor unit. The seventh and eighth control inputs of the i-th processor unit are connected correspondingly with the i-th outputs of the first and second groups control outputs of the buffering block. The third group of control outputs and the first group of the informational outputs of the buffering block are connected correspondingly with the third group of control inputs and the first group of informational inputs of the auxiliary switch. The second group of informational outputs of the buffering block is connected with the second informational output of the system. The fourth group of control inputs of the auxiliary switch is connected with the fourth group of control outputs of the buffering block. The i-th input of the first group of informational inputs of the buffering block is connected with the fourth and fifth informational outputs of the i-th processor unit. The fourth control output of i-th processor unit is connected with the i-th input of the third group of control inputs of the buffering block. The third group of informational outputs of the buffering block is connected with the second group of informational inputs of the auxiliary switch. The first control output of the i-th module of associative memory is connected with the i-th input of the second group of control inputs of the switch. The i-th output of the group of informational outputs of the switch is connected with the informational input of the i-th module of associative memory. The informational and the second control outputs of the i-th module of associative memory are connected with the i-th inputs of the second group of informational inputs and the fourth group of control inputs of the buffering block. The third group of informational inputs of the buffering block is connected with the third informational input of the system. And, the i-th output of the group of control outputs of the switch is connected with the second control input of the i-th module of associative memory.

2. Each processor unit, according to the invention, may contain the first and second switches, the first and second control units, an executive device for instruction processing and an executive device for operand processing. The first and second control inputs of the first switch are connected with the first and second control outputs of the first control unit of control. The third control output of the first control unit is connected with the first control input of the executive device for instruction processing. The first and the second control outputs of the second control unit are connected with the first and second control inputs of the second switch. The first informational input of the second switch is connected with the address output of the executive device for instruction processing, the first informational output of the executive device for instruction processing is connected with the second informational input of the second switch and the first informational input of the first switch. The second informational output of the executive device for instruction processing is connected with the second informational input of the first switch and the third informational input of the second switch. The first control output of the executive device for instruction processing is connected with the first control input of the first control unit. The fourth control output of the first control unit is connected with the first control input of the executive device for operand processing. The first control output of the executive device for operand processing is connected with the second control input of the first control unit. The first control input of the second control unit is connected with the second control output of the executive device for operand processing. The second control output of the executive device for instruction processing is connected with the second control input of the second control unit. The second control input of the executive device for instruction processing is connected with the third control output of the second control unit. The fourth control output of the second control unit is connected with the second control input of the executive device for operand processing. The fourth informational input of the second switch is connected with the address output of the executive device for operand processing. The first informational output of the executive device for operand processing is connected with the fifth informational input of the second switch and the third informational input of the first switch. The second informational output of the executive device for operand processing is connected with the fourth informational input of the first switch and with the sixth informational input of the second switch. The first, second and third informational outputs of the second switch are the address output, the first informational output and second informational output of the processor unit respectively. The third informational outputs of the executive device for instruction processing and of the executive device for operand processing are connected with the third informational output of the processor unit. The fourth and fifth informational outputs of the processor unit are respectively the first and second informational outputs of the first switch. The fifth control output of the second control unit is connected with the first control output of the processor unit. The second and third control outputs of the processor unit are the third control outputs of the executive device for instruction processing and of the executive device for operand processing respectively. The fourth control output of the processor unit is connected with the fifth control output of the first control unit. The first informational, address and control inputs of the processor unit are the first informational, address and the third control inputs of the executive device for instruction processing respectively. The second informational, address and control inputs of the processor unit are connected correspondingly with the first informational, address and the third control inputs of the executive device for operand processing. The fourth control input of the executive device for operand processing and the fourth control input of the executive device for instruction processing are connected with the third control input of the processor unit. The fourth control input of the processor unit is connected with the third control input of the second control unit. The third informational input of the processor unit is the second informational input of the executive device for instruction processing. The fifth control input of the executive device for instruction processing is the fifth control input of the processor unit. The fourth informational and the sixth control inputs of the processor unit are connected with the second informational and the fifth control inputs of the executive device for operand processing respectively. And, the seventh and eighth control inputs of the processor unit are connected with the third and fourth control inputs of the first control unit respectively.

3. The auxiliary switch, according to the invention, may contain the first and second control units and the first and second switching units. The first groups of the control outputs of the first and second control units are connected with the first and second groups of the control outputs of the auxiliary switch respectively. The first and second control outputs of the i-th group of exchange outputs of the auxiliary switch are connected with the i-th outputs of the second group of the control outputs of the first and second control units respectively. The control inputs of the first and second control units are connected with the control input of the auxiliary switch. The first and second groups of the informational inputs of the auxiliary switch are connected with the groups of the informational inputs of the first and second switching units respectively. The i-th outputs of the group of the informational outputs of the first and second switching units are connected correspondingly with the first and second informational outputs of the i-th group of the exchange outputs of the auxiliary switch. The first and second groups of the control inputs of the auxiliary switch are connected with the first groups of the control inputs of the first and second control units respectively. The groups of the control outputs of the first and second switching units are connected correspondingly with the second groups of the control inputs of the first and the second control units. The third groups of the control inputs of the first and the second control units are connected correspondingly with the third and fourth groups of the control inputs of the auxiliary switch. And, the third groups of the control outputs of the first and second control units are connected with the first groups of the control inputs of the first and second switching units respectively. The second group of the control inputs of each of these units is connected correspondingly with the fourth group of the control outputs of the first and second control units.

4. The buffering block, according to the invention, may contain the group of buffering units. The first, second and third control outputs of the i-th buffering unit are connected with the i-th outputs of the first, second and third groups of the control outputs of the buffering block respectively. The i-th inputs of the first and second groups of the control inputs of the buffering block are connected with the first and second control inputs of the i-th buffering unit respectively. The fourth control output of the buffering unit is connected with the i-th output of the fourth group of the control outputs of the buffering block. The control input of the buffering block is connected with the third control input of each of the buffering units. The i-th inputs of the third and fourth groups of the control inputs of the buffering block are connected with the fourth and fifth control inputs of the i-th buffering unit respectively. The first, second and third informational outputs of the buffering units are connected correspondingly with the i-th outputs of the first, second and third groups of the informational outputs of the buffering block. The i-th inputs of the first, second and third groups of the informational inputs of the buffering block are connected with the first, second and third informational inputs of the i-th buffering unit respectively.

BRIEF DESCRIPTION OF THE FIGURES

Further on the invention is illustrated by an example of its application and attached drafts, where:

FIG. 35 represents the informational package structure.

DETAILED DESCRIPTION OF THE INVENTION

This application introduces a new architecture for a computing system which utilizes the principle of data flow processing.

The program scheme of a dataflow system is described as a graph consisting of nodes and archs connecting the nodes. The nodes represent operations and the archs represent the path of tokens through the system. The information represented by a node is assembled into packets.

Tokens of information are words which are subdivided into a number of fields. Fields may include an opcode field to represent the operation to be performed on the data, one data field to represent the information to be processed, one or two destination fields to represent the destination or node to which the results of processing are directed, and other fields to represent the context of program execution, tags or keys to be used for identification during processing, etc. Keys or tags are used to identify the iteration being performed, the individual tokens of a pair destined for the same node, etc.

Packets of information also are words which are subdivided into a number of fields. A packet may contain one or two data fields.

Thus, a program written according to a dataflow graph will indicate the direction in which the data is transferred during processing. Each node processes the input data and yields one or more results destined to a system output or to one or more other nodes.

Figure 36:
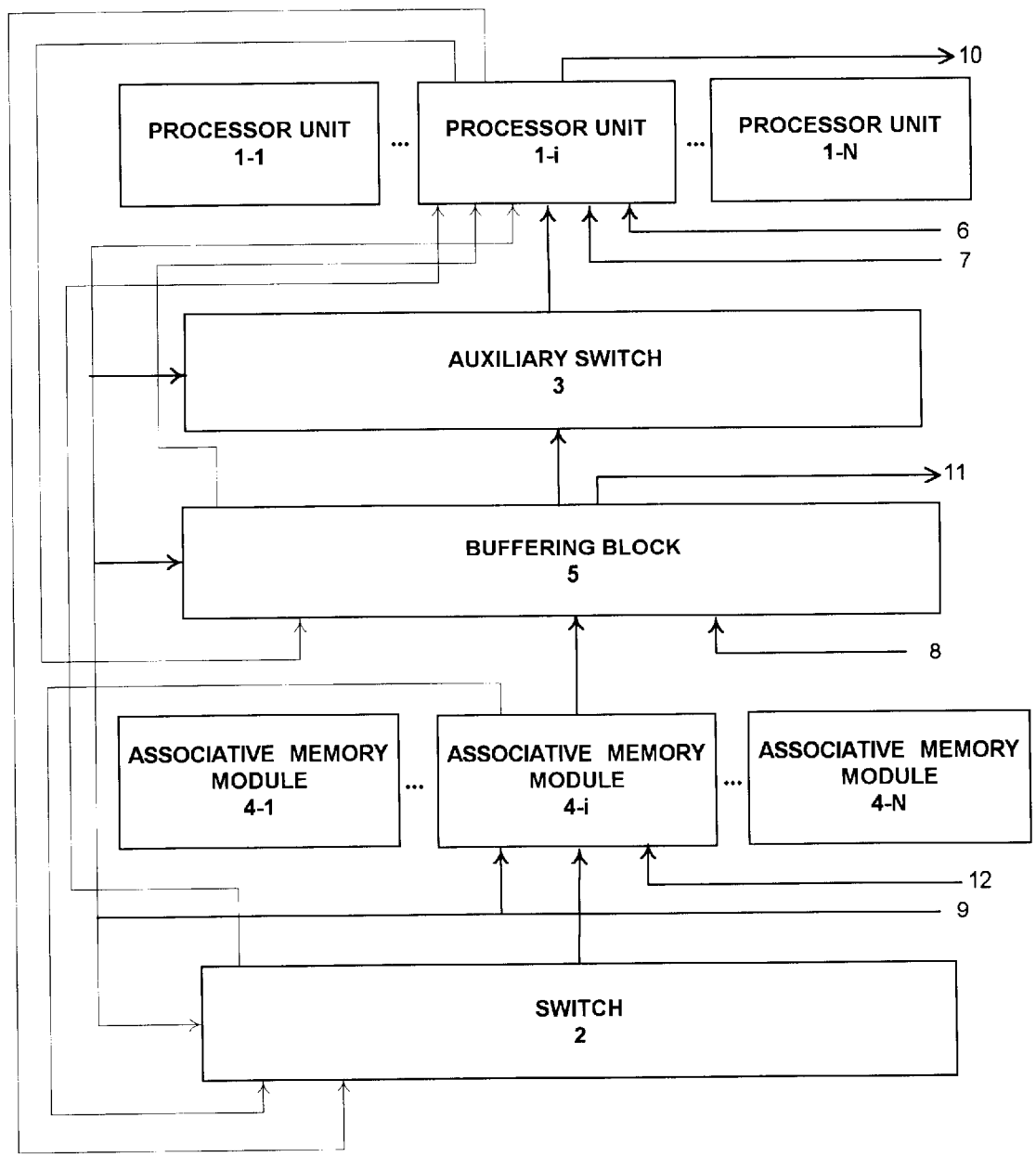
FIG. 36 is a schematic of the system of the invention.

Referring to FIG. 36, the system disclosed in this application comprises N processor units (1-i) where N is a positive integer (i=1, . . . N), switch (2), auxiliary switch (3), buffering block (5), and M associative memory modules (4-i) where M is a positive integer (i=1, . . . M).

Buffering block 5 is used to smooth peaks of the input queries on the inputs of the auxiliary switch 3. The use of buffering block 5 in the starting process is its additional function.

In general, the system comprises at least one processor unit, at least one associative memory module at least one switch and at least one auxiliary switch. The functions of the buffering block my be carried out by separate buffering means, such as, for example, buffering block (5), or by buffering means incorporated in other units of the system, such as, for example, an auxiliary switch.

In a system with more than one processor unit, the design and configuration of each processor unit is preferrably the same as the design and configuration of every other processor unit. This affords certain advantages. For example, if one or several processors in a system fail, the system will still operate without need for adjustment by the user or programmer. Each processor unit comprises local or command instruction memory units, which may be subdivided into smaller subunits, which in turn may be dedicated to a particular executive device. A processor unit may comprise any number of executive devices. Preferably, in a given processor unit, each executive device is best suited to processing a particular type of information. For example, each processor unit may comprise two executive devices and local command instruction memory subunits dedicated to each executive device, wherein one executive device is best suited to processing control instructions and the other executive unit is best suited to processing operands.

The entire command instruction set of the program being executed is loaded into each processor unit. Preferably, in a processor unit with more than one executive device and with a local memory subunit dedicated to each executive device, those instruction used only by a given executive device are loaded only into the memory subunit dedicated to that executive device.

Packets destined for processing in the processor units are directed through the buffering block to the auxiliary switch. The buffering block identifies each packet on the basis of the type of data contained in the packet. Identified packets are directed to the auxiliary switch, either immediately, or after storage in a buffer until later forwarding. For example, the buffering block may distinguish packets containing operands from packets containing control instructions. In another example, the buffering block may comprise at least one buffer dedicated to receiving operand packets and at least one buffer dedicated to receiving control instructions.

The auxiliary switch sequentially distributes each packet received to the next available processor unit. Preferably, each packet is directed not only to the next available processor unit but also is directed specifically to the executive device best adapted for the processing of the packet on the basis of packet type. Transmission from the auxiliary switch to a processor unit is determined by a "free address" switching regime. That is, control signals direct transmission of information from the auxiliary switch to a free processor unit. That is, the system comprises free address switching means to transmit information from an auxiliary switch to a free processor unit. For example, the transmission may be directed by the presence of a free register.

Packets received in an executive device are processed and the results of processing are obtained. If a result is a final result, that is, it is not destined for another node, the result is directed to an output of the system. If the result is a single input result, that is, it is destined to be the only input in a subsequent node, the result is sent directly to the buffering block for further processing. If the result is a double input result, that is, it is destined to be one of two inputs in a subsequent node, the result is sent indirectly to the buffering block, through the switch and the associative memory, for further processing.

Each token received by the switch must be matched with its pair for further processing. The switch utilizes a key on each token received to determine if the token's pair is already stored in associative memory. If the pair is found, the two tokens are paired together into a packet. Packets are directed to the buffering block, either immediately, or after storage in associative memory until later forwarding. If the received token's pair is not found, the token is directed to and stored in associative memory to await the arrival of its pair. The transmission of a token from a processor unit to an associative memory module is determined by a "fixed address" switching regime. That is, the system comprises fixed address switching means to transmit information from a processor unit to an associative memory module.

For example, an associative memory unit may comprise more than one module of associative memory. In this instance, a token is directed to a specific module or location of associative memory on the basis of a key encoded in the token. Each token of a pair is encoded with the same key in order to facillitate the pairing of tokens. Preferrably, the number of the module is determined from the key encoded on the token utilizing a hashing function. Also, preferrably, the hashing function is implemented in hardware and applied in the processor unit.

Preferrably, the auxiliary switch and/or the switch utilize an optical system, such as a dimensional or spatial optical system, to facilitate switching. That is, preferrably, the system comprises at least one optical system to facilitate switching. For example, each switch comprises a dimensional optical system. The dimensional optical system comprises a first transforming-transmitting unit, a laser emitter, a photo-receiver, and a second transforming-transmitting unit. The optical system may also comprise a controlled deflector, a first group of lens rasters, a controlled optical transparency, and a second group of optical lens rasters. A packet or token is transmitted to an input register. Parallel code from the input register is transmitted to a first transforming-transmitting unit in which the parallel code is transformed to serial code which is transmitted to the laser emittter. A laser signal corresponding to the serial code is transmitted through an optical system to a photo-receiver, and from the photo-receiver to a second transforming-transmitting unit in which the serial code is transformed to a parallel code corresponding to the packet or token recieved at the input register.

The Best Way to Implement the Invention

Figure 1:
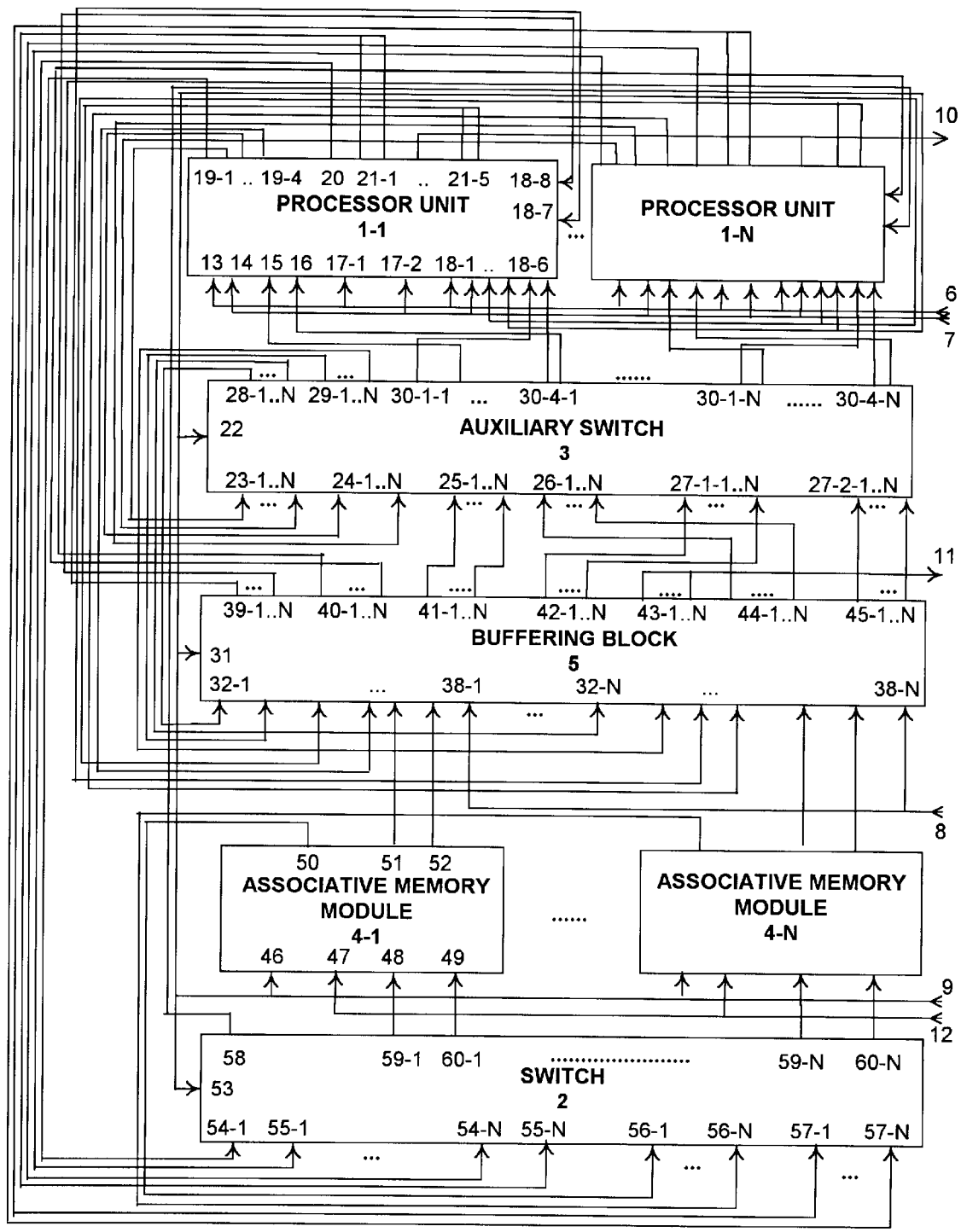
FIG. 1 represents the functional diagram of the computer system.

The computer system (FIG. 1) contains a group of processor units 1-1 . . . 1-N, a switch 2, an auxiliary switch 3, a group of associative memory modules 4-1 . . . 4-N and a buffering block 5.

The computer system also contains the first, second and third informational inputs 6, 7 and 8, control input 9, the first and second informational outputs 10–11 and memory zeroizing input 12.

Each processor unit 1-i contains the first, second, third and fourth informational inputs 13, 14, 15 and 16, the first and second address inputs 17-1 and 17-2, the first to the eighth control inputs 18-1 . . . 18-8 respectively, the first to the fourth control outputs 19-1 . . . 19-4, an address output 20 and the first to the fifth informational outputs 21-1 . . . 21-5.

Auxiliary switch 3 contains control input 22, the first to the fourth groups of control inputs 23-1 . . . 23-N, 24-1 . . . 24-N, 25-1 . . . 25-N, 26-1 . . . 26-N, the first and second groups of informational inputs 27-1-1 . . . 27-1-N and 27-2-1 . . . 27-2-N, the first and the second groups of control outputs 28-1 . . . 28-N and 29-1 . . . 29-N; N groups of exchange outputs, each of which includes the first control, first informational, the second control and the second informational outputs 30-1-i, 30-2-i, 30-3-i, and 30-4-i respectively.

Buffering block 5 contains control input 31, the first and the second groups of control inputs 32-1 . . . 32-N and 33-1 . . . 33-N, the first group of informational inputs 34-1 . . . 34-N, the third group of control inputs 35-1 . . . 35-N, the second group of informational inputs 36-1 . . . 36-N, the fourth group of control inputs 37-1 . . . 37-N, and the third group of informational inputs 38-1 . . . 38-N. Buffering block 5 also contains the first to the third groups of control outputs 39-1 . . . 39-N, 40-1 . . . 40-N, 41-1 . . . 41-N, the first and the second groups of informational outputs 42-1 . . . 42-N and 43-1 . . . 43-N, the fourth group of control outputs 44-1 . . . 44-N and the third group of informational outputs 45-1 . . . 45-N.

Each associative memory module 4-i contains first control input 46, zeroizing input 47, informational input 48, second informational input 49, first control output 50, informational output 51 and second control output 52.

Switch 2 contains control input 53, the first group of control inputs 54-1 . . . 54-N and the group of address inputs 55-1 . . . 55-N. Switch 2 also contains the second group of control inputs 56-1 . . . 56-N, the group of informational inputs 57-1 . . . 57-N, control output 58, the group of informational outputs 59-1 . . . 59-N and the group of control outputs 60-1 . . . 60-N. The synchronization and energy supply chains are not shown.

Each processor unit 1-i (FIG. 2) includes the first and the second switches 61 and 62, the first and the second switch control units 63 and 64 for the first and the second switches respectively, executive device for instruction processing 65 and executive device for operand processing 66.

Switch 61 contains the first and the second control inputs 67-1 and 67-2, the first to the fourth informational inputs 68-1, 68-2, 69-1, 69-2, and the first and the second informational outputs, connected with the outputs 21-4 and 21-5 of the processor unit.

Switch 62 contains the first and the second control inputs 70-1 and 70-2, the first to the sixth informational inputs 71-1, 71-2, 71-3, 72-1, 72-2, 72-3, and the first to the third informational outputs, connected with the outputs 20, 21-1, 21-2 of the processor unit respectively.

First switch control unit 63 contains the first and the second control inputs 73, 74, the first to the fourth control outputs 75-1, 75-2, 76-1, 76-2, the third and the fourth control inputs which are connected with inputs 18-7 and 18-8 of the processor unit, and the fifth control output which is connected with output 19-4 of the processor unit.

Second switch control unit 64 contains the first and the second control inputs 77 and 78, the first to the fourth control outputs 79-1, 79-2 and 80-1, 80-2, the third control input which is connected with input 18-4 of the processor unit, and the fifth control output which is connected with output 19-1 of the processor unit.

Executive device for instruction processing 65 includes the first and the second control inputs 81 and 82, the first and the second control outputs 83 and 84, the third control output 85, address output 86, the first and the second informational outputs 87 and 88, the third informational output which is connected with the output 21-3 of the processor unit, the first and the second informational inputs which are connected with inputs 13 and 15 of the processor unit respectively, the third to the fifth control inputs which are connected with inputs 18-1, 18-3, and 18-5 of the processor unit respectively, and an address input connected with input 17-1 of the processor unit.

Executive device for operand processing 66 contains the first and the second control inputs 89 and 90, the first to the third control outputs 91, 92, 93, address output 94, the first and the second informational outputs 95 and 96, the third informational output which is connected with the output 21-3 of the processor unit, the first and the second informational inputs which are connected with inputs 14 and 16 of the processor unit respectively, the third to the fifth control inputs which are connected with inputs 18-2, 18-3, and 18-6 of the processor unit respectively, and an address input connected to input 17-2 of the processor unit.

Figure 3:
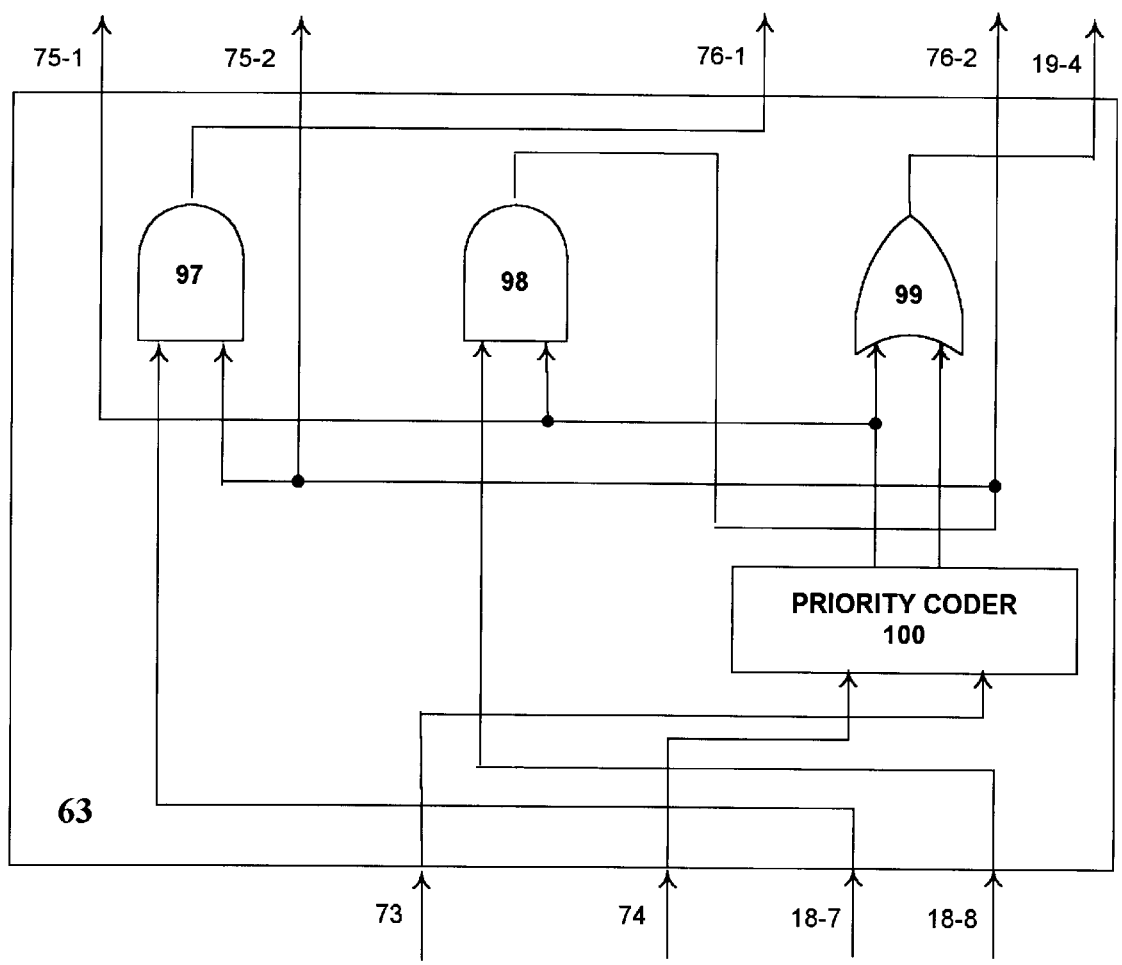
FIG. 3 represents the functional diagram of the control unit of the first switch of the processor unit.
Figure 4:
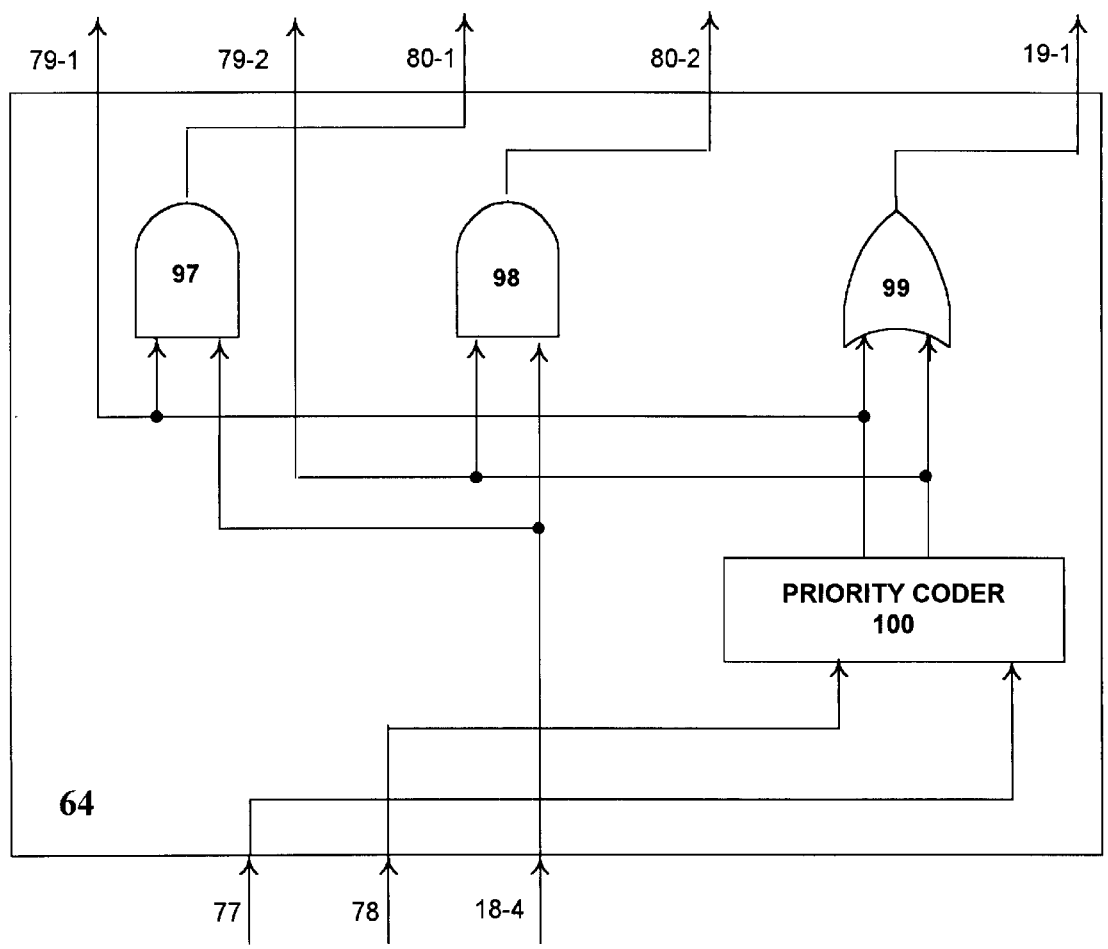
FIG. 4 represents the functional diagram of the control unit of the second switch of the processor unit.

Each switch control unit 63 (FIG. 3) and 64 (FIG. 4) contains "AND" elements 97 and 98, "OR" element 99 and priority coder 100.

Executive device for instruction processing 65 (FIG. 5) contains control unit 101, output switch 102, switching block 103, instruction register unit 104, instruction memory 105, arithmetic-logical unit (ALU) 106, loading switch 107 and input register unit 108.

Control unit 101 contains input 109-1 for zeroizing, the first and the second inputs 109-2 and 109-3 for control of result transmission, starting control input 109-4, input 109-5 for instruction type bits, input 109-6 for memory readiness signal, input 109-7 for the ALU result significance signal, input 109-8 for the ALU readiness signal, input 109-9 for the instruction code, the first and the second outputs 110-1 and 110-2 for the data readiness signal, output 110-3 for the control of field switching, output 111-4 for the control of data reception, ALU starting control output 111-5 and output 111-6 for the control of instruction retrieval.

Output switch 102 contains the first and the second control inputs 112-1 and 112-2, the first and the second informational inputs 112-3 and 112-4 and an informational output connected with the outputs 86 and 88 of the executive device 65.

Switching block 103 contains control inputs 113-1 ... 113-12, informational inputs 114-1 ... 114-10 and 115-1 ... 115-4, and informational outputs connected with the output 87 of executive device 65 and with inputs 112-3 and 112-4 of switch 102.

Instruction register unit 104 contains informational input 116-1, control input 116-2, and informational outputs connected with the inputs 115-1 ... 115-4 of block 103.

The instruction memory 105 contains load control input 117-1, informational input 117-2, address input 117-3, reading control input 117-4, and informational and control outputs connected with the corresponding inputs 116-1 and 116-2 of the instruction register unit and with the corresponding inputs 109-5 and 109-6 of the control unit 101.

Arithmetic-logical unit (ALU) 106 (made analogously to the device SU 1367012) contains instruction control input 118-1, first and second operand inputs 118-2 and 118-3, starting control input 118-4, first and second informational outputs 119-1 and 119-2, and control output 119-3.

Loading switch 107 contains first and second informational inputs 120-1 and 120-2, first and second control inputs 120-3 and 120-4, and an informational output connected with address input 117-3 of instruction memory 105.

Input register unit 108 contains control input 121-1, informational outputs 122-1 ... 122-11.

Figure 6:
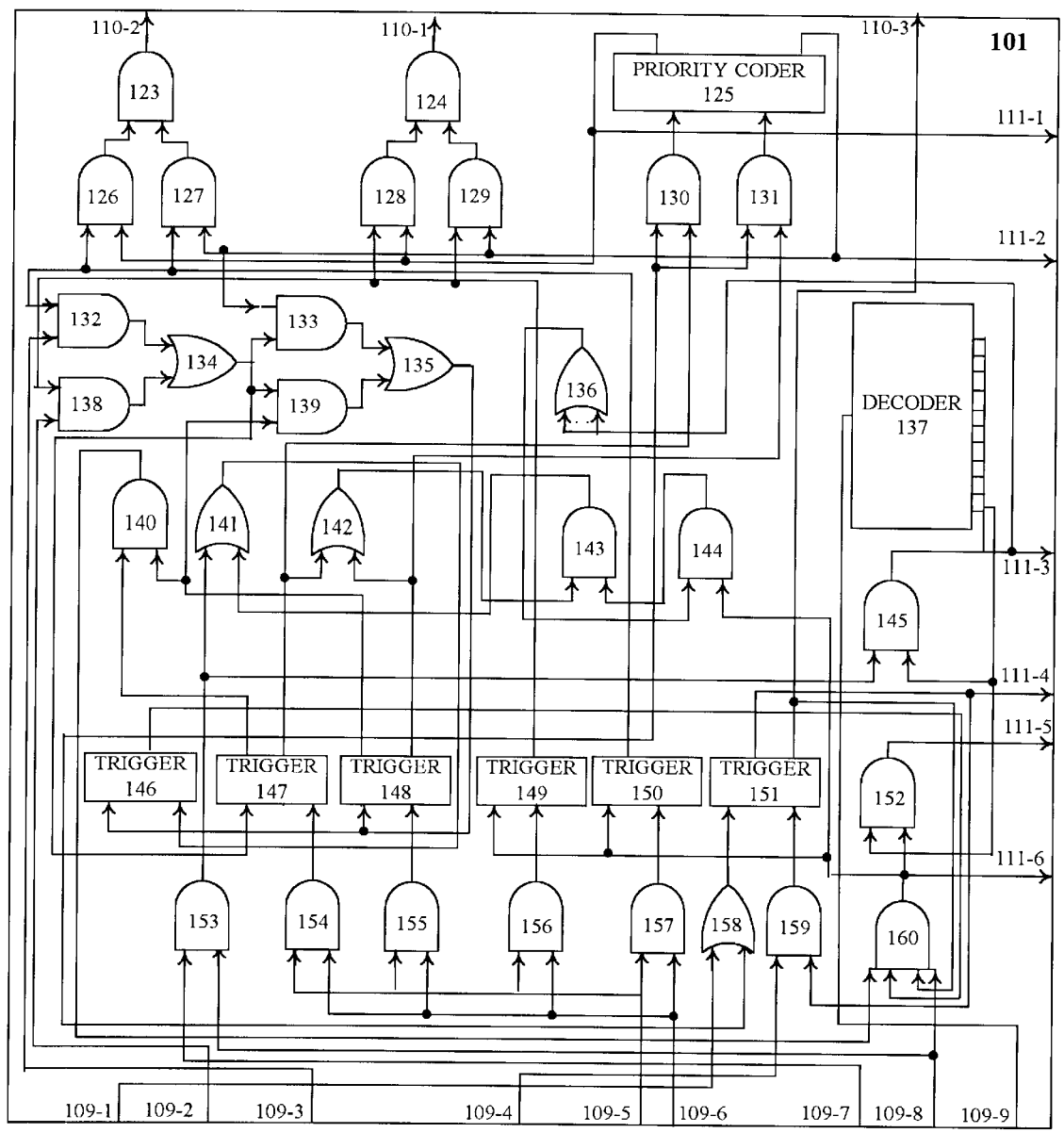
FIG. 6 represents the functional diagram of the control unit of the executive device for instruction processing of the processor unit.

Control unit 101 (FIG. 6) contains "AND" elements 123 and 124, priority coder 125, "AND" elements 126 ... 133, "OR" elements 134 ... 136, decoder 137, "AND" elements 138 ... 140, "OR" elements 141 and 142, "AND" elements 143 ... 145, control triggers 146 ... 151, "AND" elements 152 ... 157, "OR" element 158, and "AND" elements 159 and 160.

Switching block 103 (FIG. 7) contains registers 161 ... 171, control unit 172, and switches 173 ... 178.

Figure 8:
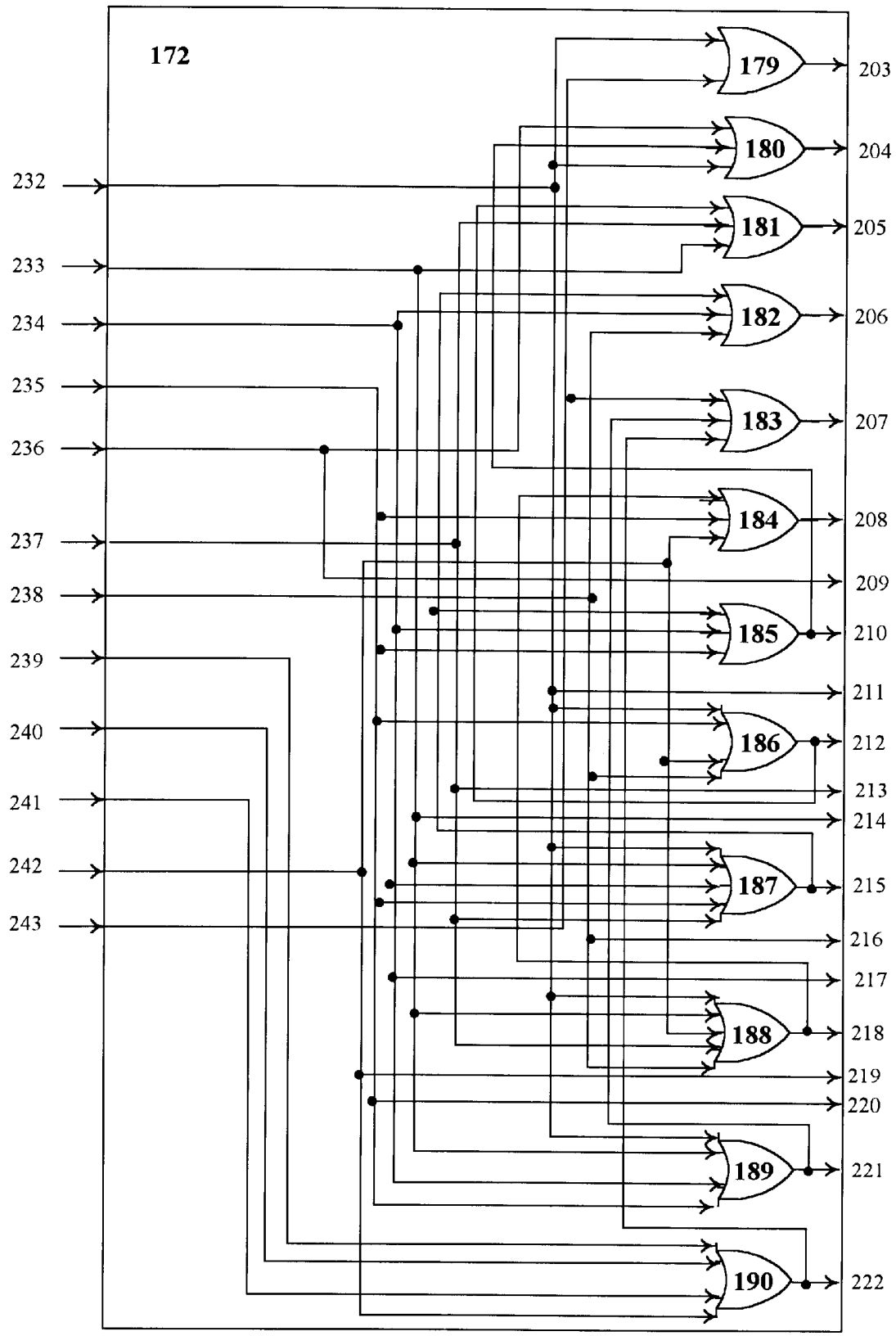
FIG. 8 represents the functional diagram of the control unit of the switching block of the executive device for instruction processing.

Control unit 172 (FIG. 8) contains "OR" elements 179 ... 190, control inputs 191 ... 202, and control outputs 203 ... 222.

Figure 9:
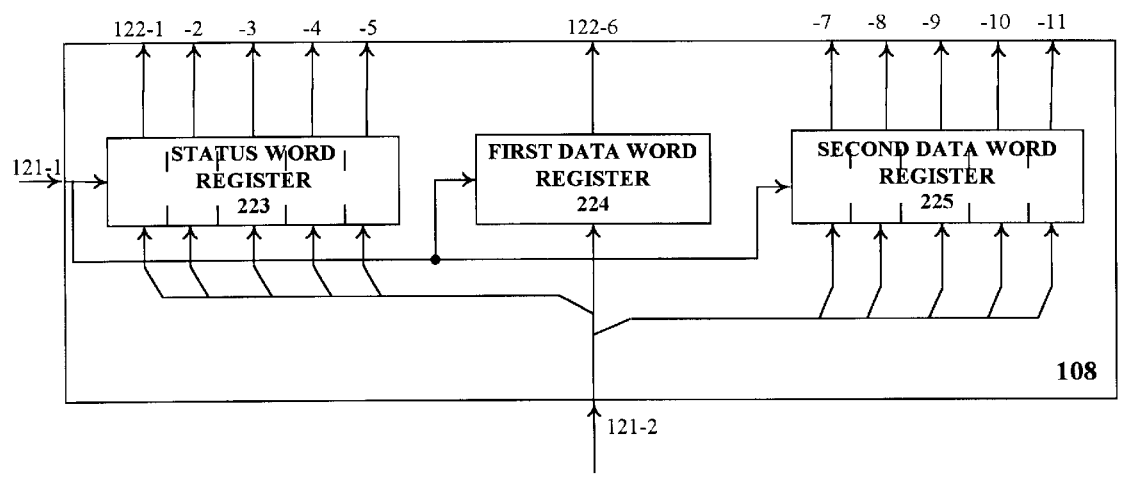
FIG. 9 represents the functional diagram of the input register unit of the executive device for instruction processing.

Input register unit 108 (FIG. 9) contains status word register 223, first data word register 224 and second data word register 225.

Figure 10:
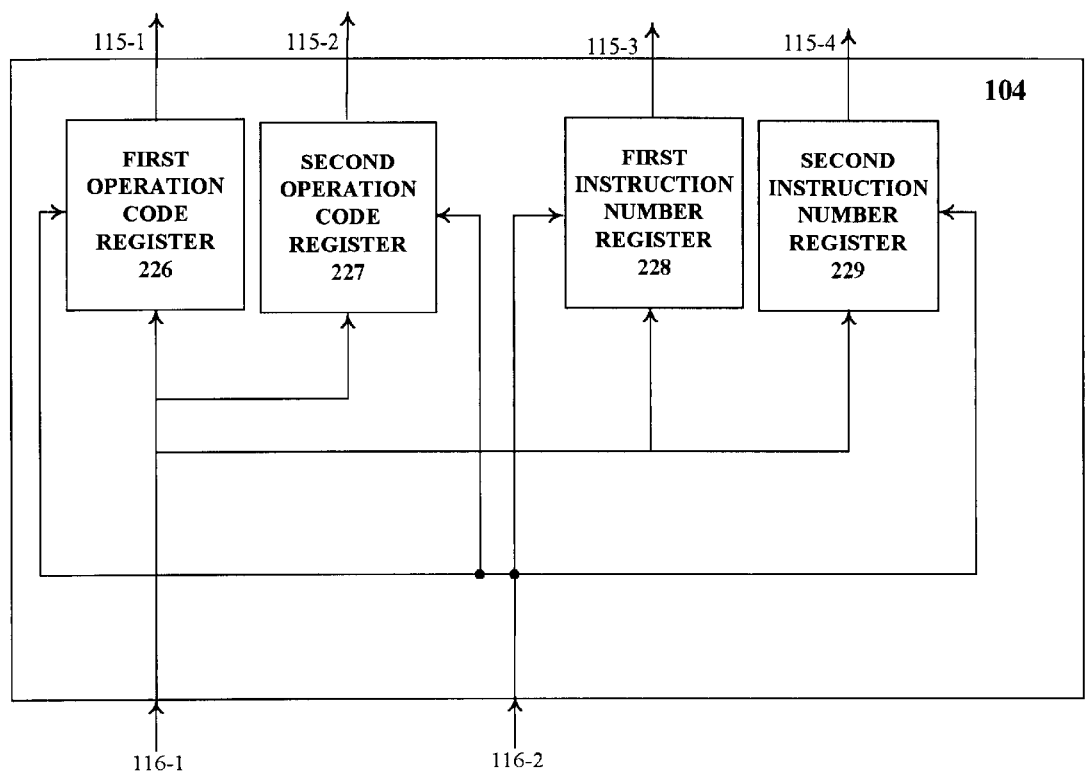
FIG. 10 represents the functional diagram of the instruction register unit of the executive device for instruction processing.

Instruction register unit 104 (FIG. 10) contains first and second operation code registers 226 and 227, and first and second instruction number registers 228 and 229.

Figure 11:
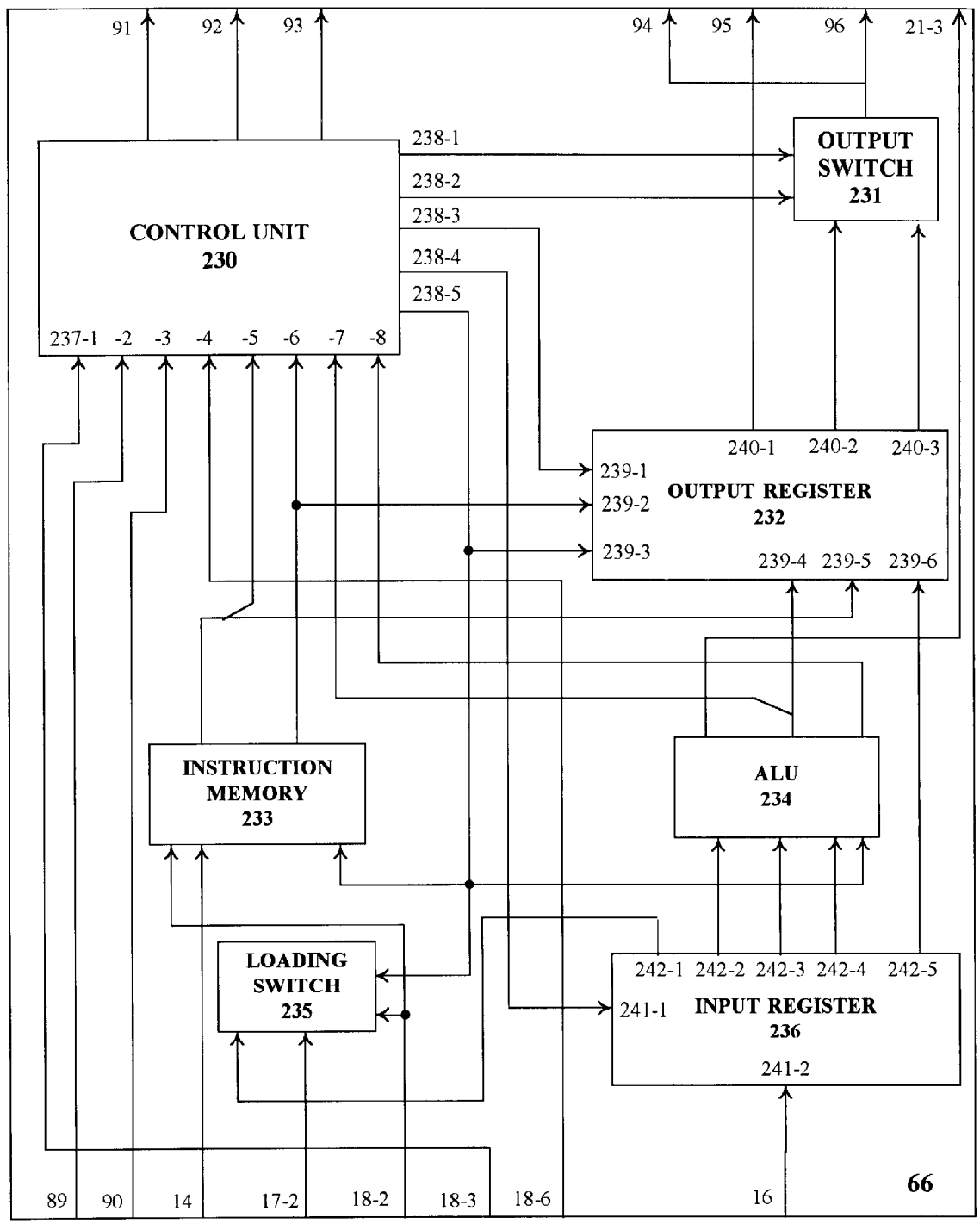
FIG. 11 represents the functional diagram of the executive device for operand processing of the processor unit.

Executive device 66 (FIG. 11) contains control unit 230, output switch 231, output register unit 232, instruction memory 233, ALU 234, loading switch 235 and input register unit 236.

Control unit 230 contains zeroizing input 237-1, first and second inputs for result transmission 237-2 and 237-3, starting control input 237-4, input for instruction type bits 237-5, input for the memory readiness signal 237-6, input 237-7 for the data significance signal, input 237-8 for the ALU readiness signal, first and second outputs for the control of output switching 238-1 and 238-2, output for transmission control 238-3, output for reception control 238-4, output for starting control 238-5, and the first to the third control outputs connected with the outputs 91 ... 93 of the executive device 66.

Output register unit 232 contains control inputs 239-1, 239-2 and 239-3, informational inputs 239-4, 239-5 and 239-6, and informational outputs 240-1, 240-2 and 240-3.

Switch 231 contains an informational output connected with outputs 94 and 96 of executive device 66, first and second control inputs connected with outputs 238-1 and 238-2 of unit 230, and first and second informational inputs connected with outputs 240-2 and 240-3 of output register unit 232.

Instruction memory 233, ALU 234 and loading switch 235 are analogous to the corresponding devices 105, 106 and 107 in executive device 65.

Input register unit 236 contains control and informational inputs 241-1 and 241-2, and informational outputs 242-1 ... 242-5.

Figure 12:
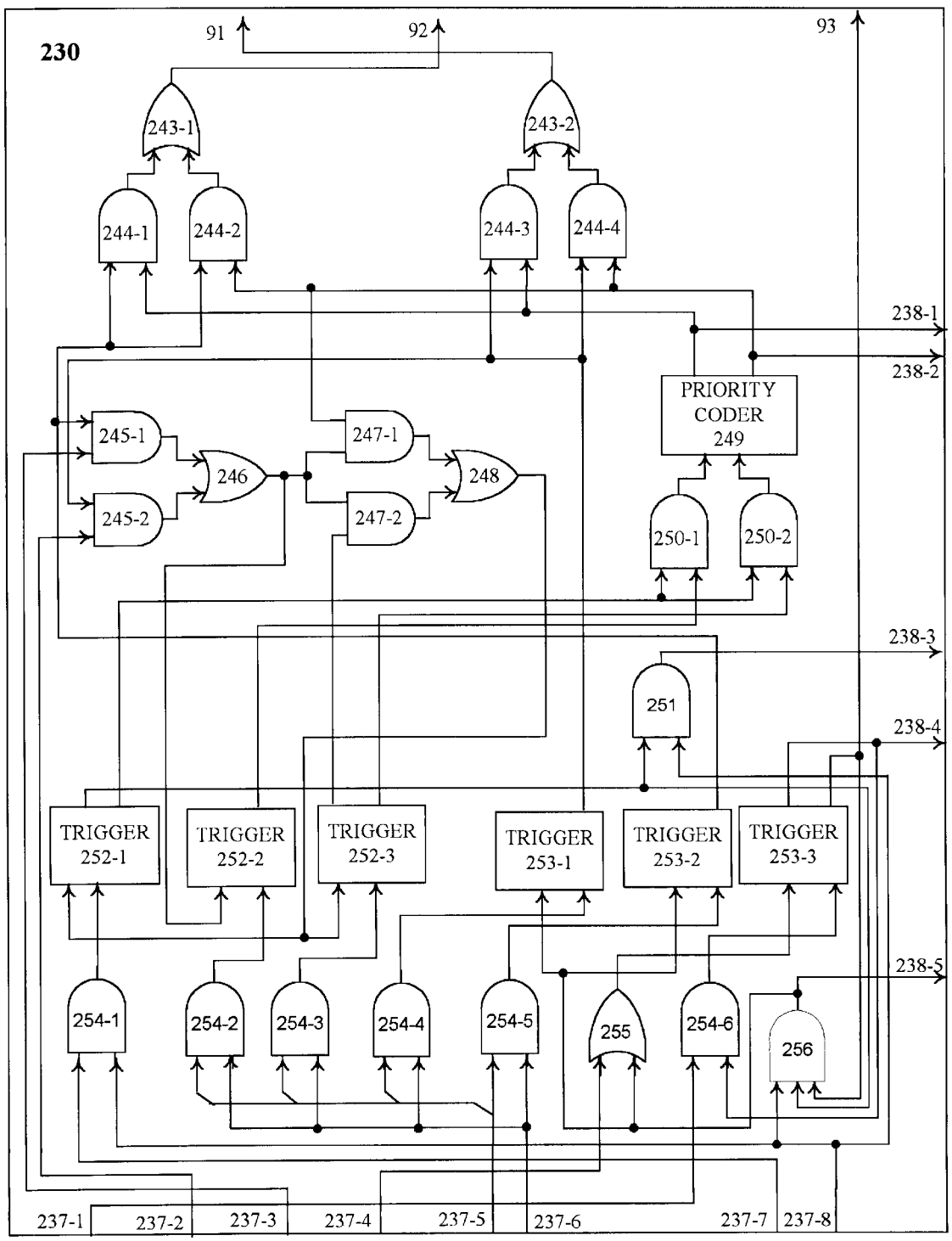
FIG. 12 represents the functional diagram of the control unit of the executive device for operand processing.

Control unit 230 (FIG. 12) contains "OR" elements 243-1 and 243-2, "AND" elements 244-1 ... 244-4, "AND" elements 245-1 and 245-2, "OR" element 246, "AND" elements 247-1 and 247-2, "OR" element 248, priority coder 249, "AND" elements 250-1 and 250-2, "AND" element 251, triggers 252-1 ... 252-3 and 253-1 ... 253-3, "AND" elements 254-1 ... 254-6, "OR" element 255, and "AND" element 256.

Figure 13:
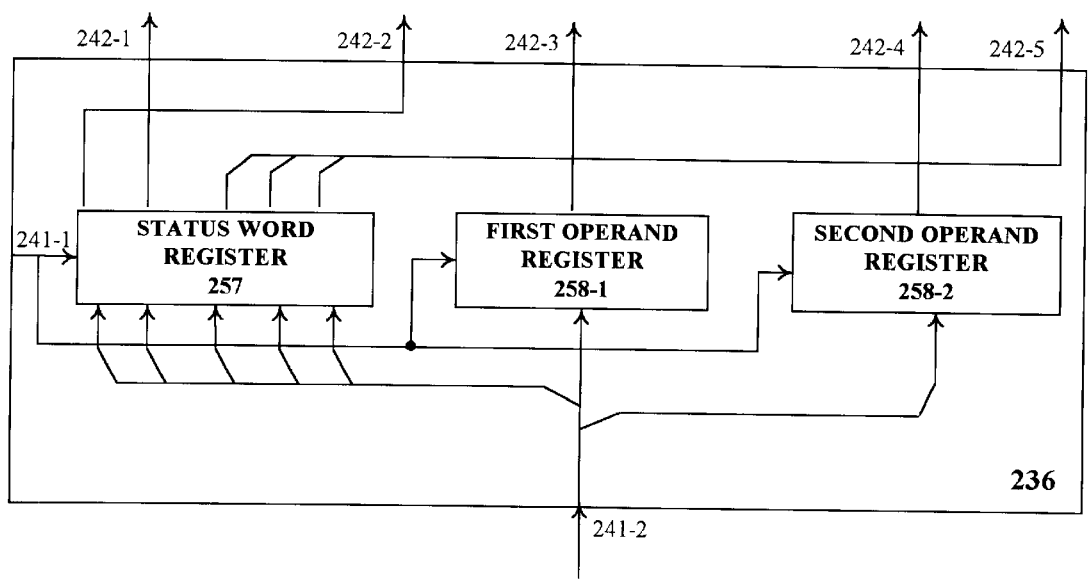
FIG. 13 represents the functional diagram of the input register unit of the executive device for operand processing.

Input register unit 236 (FIG. 13) contains registers 257, 258-1 and 258-2 for the status word bits of the first and the second operands.

Figure 14:
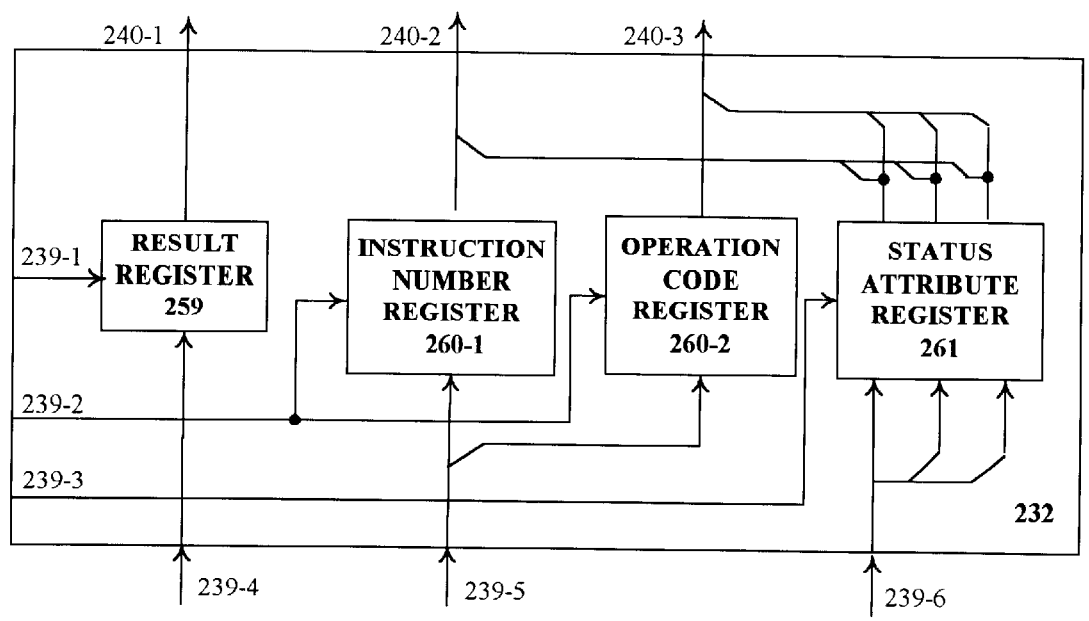
FIG. 14 represents the functional diagram of the output register unit of the executive device for operand processing.

Output register unit 232 (FIG. 14) contains result register 259, first and second registers of instruction number and operation code 260-1 and 260-2, and status attribute register 261.

Auxiliary switch 3 (FIG. 15) contains first and second control units 262-1 and 262-2, and first and second switching units 263-1 and 263-2.

Each control unit 262-1 and 262-2 contains control input 264; the first to the third groups of control inputs 265-1 . . . 265-N, 266-1 . . . 266-N, 267-1 . . . 267-N respectively; and the first to the fourth groups of control outputs 268-1 . . . 268-N, 269-1 . . . 269-N, 270-1-1 . . . 270-N-N and 271-1 . . . 271-N.

Each switching unit 263-1 and 263-2 contains the first and the second groups of control inputs 272-1-1 . . . 272-N-N and 273-1 . . . 273-N, a group of informational inputs 274-1 . . . 274-N, a group of informational outputs 275-1 . . . 275-N, and a group of control outputs 276-1 . . . 276-N.

Each control unit 262-1 and 262-2 (FIG. 16) contains a group of readiness signal formation triggers 277-1 . . . 277-N, readiness set control unit 278 and switching control block 279.

Readiness set control unit 278 contains N pairs of first and second control outputs 280-1-1 and 280-2-1 to 280-1-N and 280-2-N, zeroizing input 281, the first to the third groups of control inputs 282-1 . . . 282-N, 283-1 . . . 283-N, and 284-1 . . . 284-N, N groups of outputs 285-1-1 . . . 285-1-N to 285-N-1 . . . 285-N-N of bits for channel number switching, and N groups of inputs 286-1-1 . . . 286-1-N to 286-N-1 . . . 286-N-N of bits for channel number switching.

Switching control block 279 contains N groups of outputs 287-1-1 . . . 287-1-N to 287-N-1 . . . 287-N-N of the switching channel number set, the first and the second groups of control outputs 288-1 . . . 288-N and 289-1 . . . 289-N, zeroizing input 290, N pairs of first and second control inputs 291-1-1 and 291-2-1 to 291-1-N and 291-2-N, a group of control inputs 292-1 . . . 292-N, N groups of control outputs 293-1-1 . . . 293-1-N to 293-N-1 . . . 293-N-N of the switching elements, N groups of inputs 294-1-1 . . . 294-1-N to 294-N-1 . . . 294-N-N of the switching channel set, and the third group of control outputs 295-1 . . . 295-N.

Figure 17:
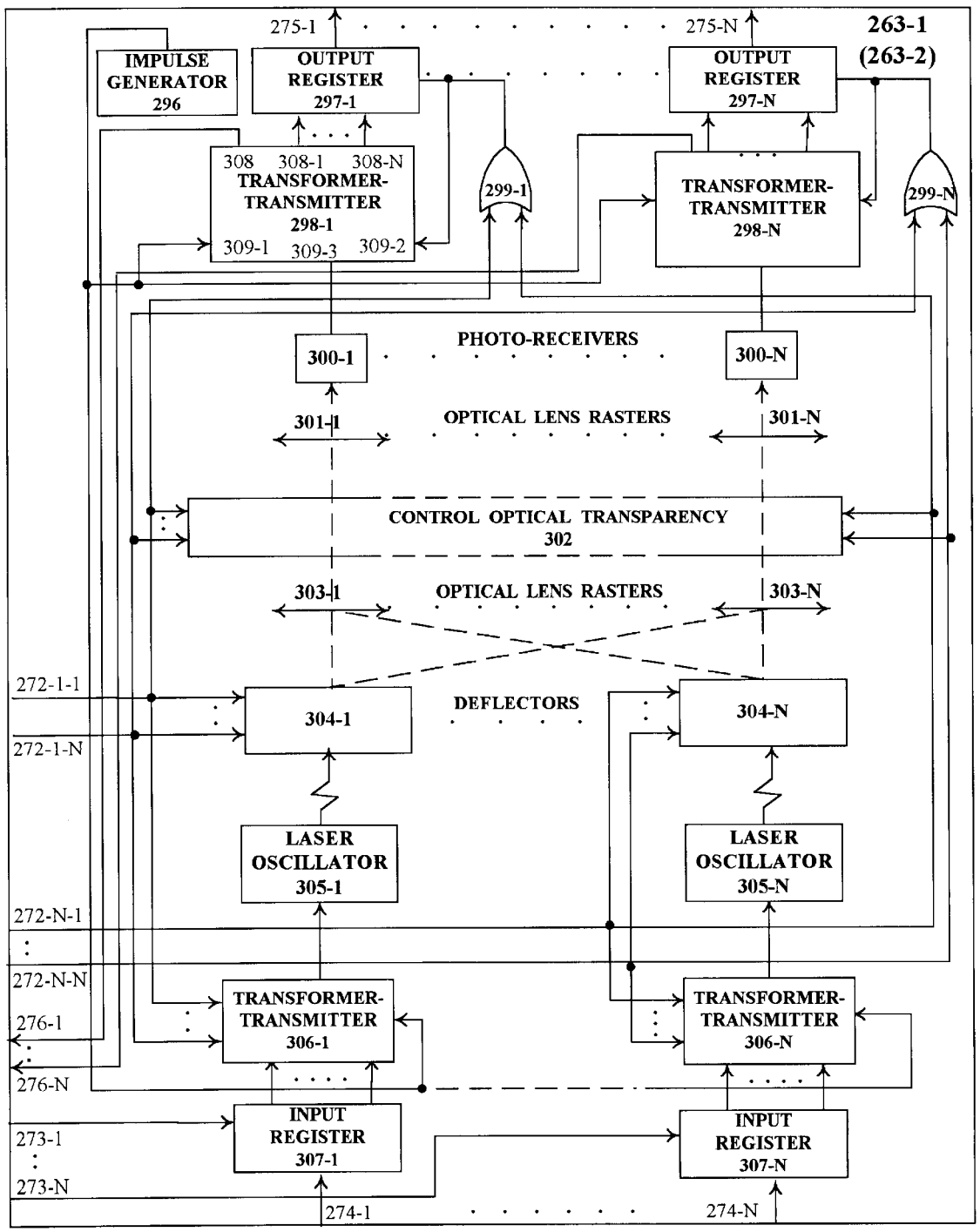
FIG. 17 represents the functional diagram of the auxiliary switch switching unit.

Each switching unit 263-1 (263-2) (FIG. 17) contains high frequency impulse generator 296, a group of output registers 297-1 . . . 297-N, a group of transforming-transmitting units 298-1 . . . 298-N, a group of "OR" elements 299-1 . . . 299-N, a group of photo-receivers 300-1 . . . 300-N, the first group of the optical lens rasters 301-1 . . . 301-N, controlled optical transparency 302, the second group of optical lens rasters 303-1 . . . 303-N, a group of deflectors 304-1 . . . 304-N, a group of laser oscillators 305-1 . . . 305-N, a group of transforming-transmitting units 306-1 . . . 306-N, and a group of input registers 307-1 . . . 307-N.

Each transforming-transmitting unit 298-i contains control output 308, informational outputs 308-1 . . . 308-N of parallel code, first and second control inputs 309-1 and 309-2, and informational input of serial code 309-3.

Figure 23:
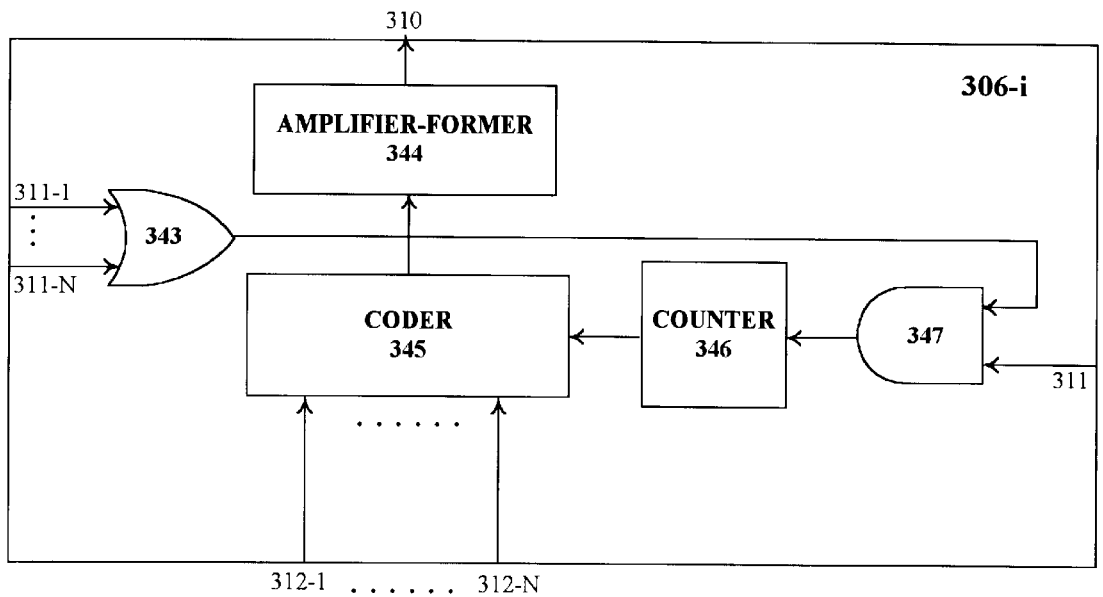
FIG. 23 represents the functional diagram of the transforming-transmitting unit of the auxiliary switch switching unit.

Each transforming-transmitting unit 306-i (FIG. 23) contains informational output of serial code 310, control input 311, a group of inputs of transforming control 311-1 . . . 311-N and a group of informational inputs of parallel code 312-1 . . . 312-N.

Figure 18:
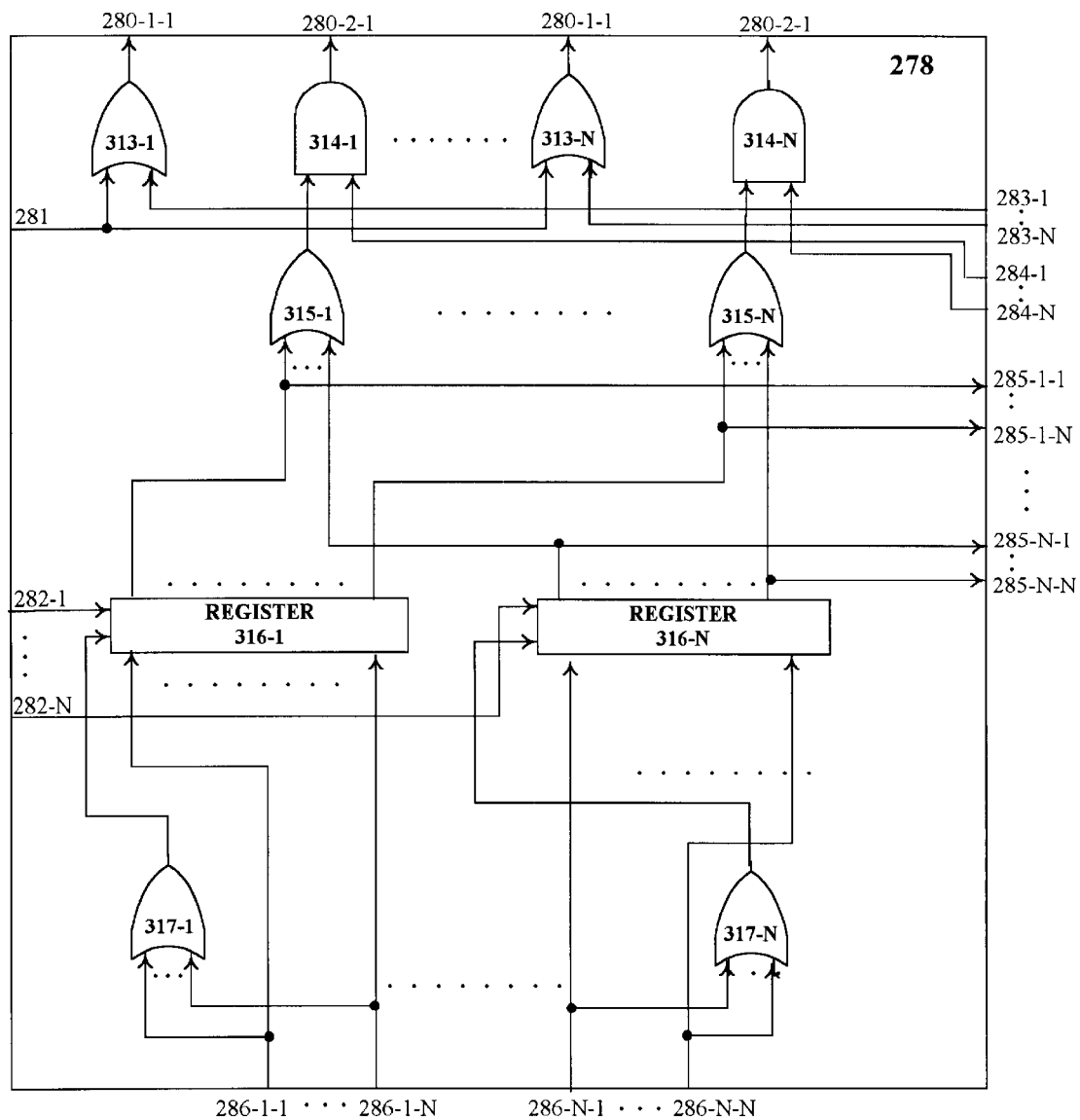
FIG. 18 represents the functional diagram of the auxiliary switch query forming control unit.

Readiness set control unit 278 (FIG. 18) contains first group of "OR" elements 313-1 . . . 313-N, group of "AND" elements 314-1 . . . 314-N, second group of "OR" elements 315-1 . . . 315-N, a group of registers 316-1 . . . 316-N, and third group of "OR" element 317-1 . . . 317-N.

Figure 19:
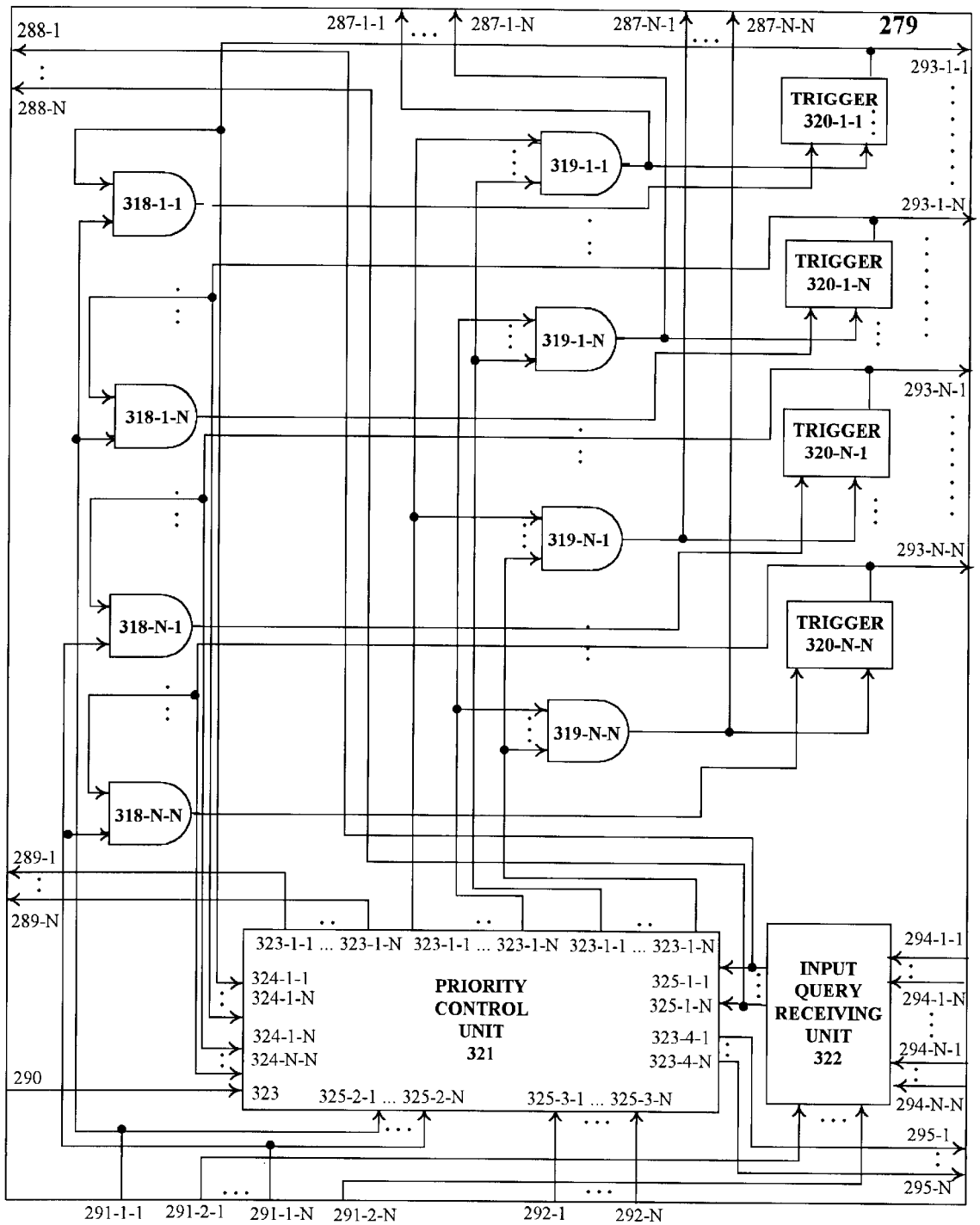
FIG. 19 represents the functional diagram of the switching control block of the auxiliary switch control unit.

Switching control block 279 (FIG. 19) contains N groups of double-input "AND" elements 318-1-1 . . . 318-1-N to 318-N-1 . . . 318-N-N, N groups of N-input "AND" elements 319-1-1 . . . 319-1-N to 319-N-1 . . . 319-N-N, N groups of triggers 320-1-1 . . . 320-1-N to 320-N-1 . . . 320-N-N, priority control unit 321 and input query receiving unit 322.

Priority control unit 321 contains zeroizing input unit 323, the first to the fourth groups of control outputs 323-1-1 . . . 323-1-N, 323-2-1 . . . 323-2-N, 323-3-1 . . . 323-3-N and 323-4-1 . . . 323-4-N, N groups of inputs 324-1-1 . . . 324-1-N to 324-N-1 . . . 324-N-N of output channel sampling control, and the first to the third groups of control inputs 325-1-1 . . . 325-1-N, 325-2-1 . . . 325-2-N, 325-3-1 . . . 325-3-N.

Figure 20:
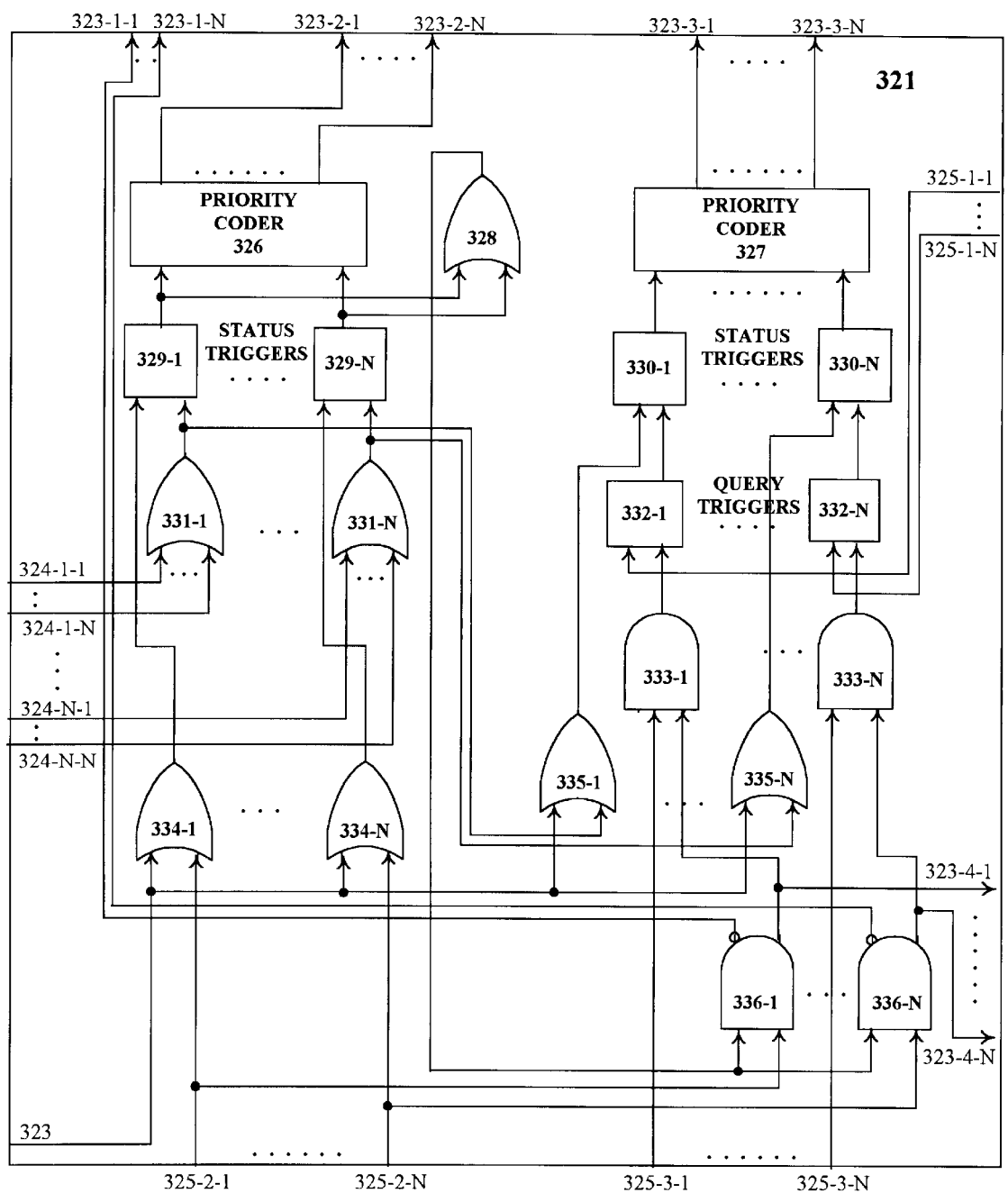
FIG. 20 represents the functional diagram of the switching priority control unit of the switching control block of the auxiliary switch control unit.

Priority control unit 321 (FIG. 20) contains the first and the second priority coders 326 and 327, "OR" element 328, the first and the second groups of status triggers 329-1 . . . 329-N and 330-1 . . . 330-N, the first group of "OR" elements 331-1 . . . 331-N, a group of query triggers 332-1 . . . 332-N, the first group of "AND" elements 333-1 . . . 333-N, the second and the third groups of "OR" elements 334-1 . . . 334-N and 335-1 . . . 335-N, and the second group of "AND" elements 336-1 . . . 336-N.

Figure 21:
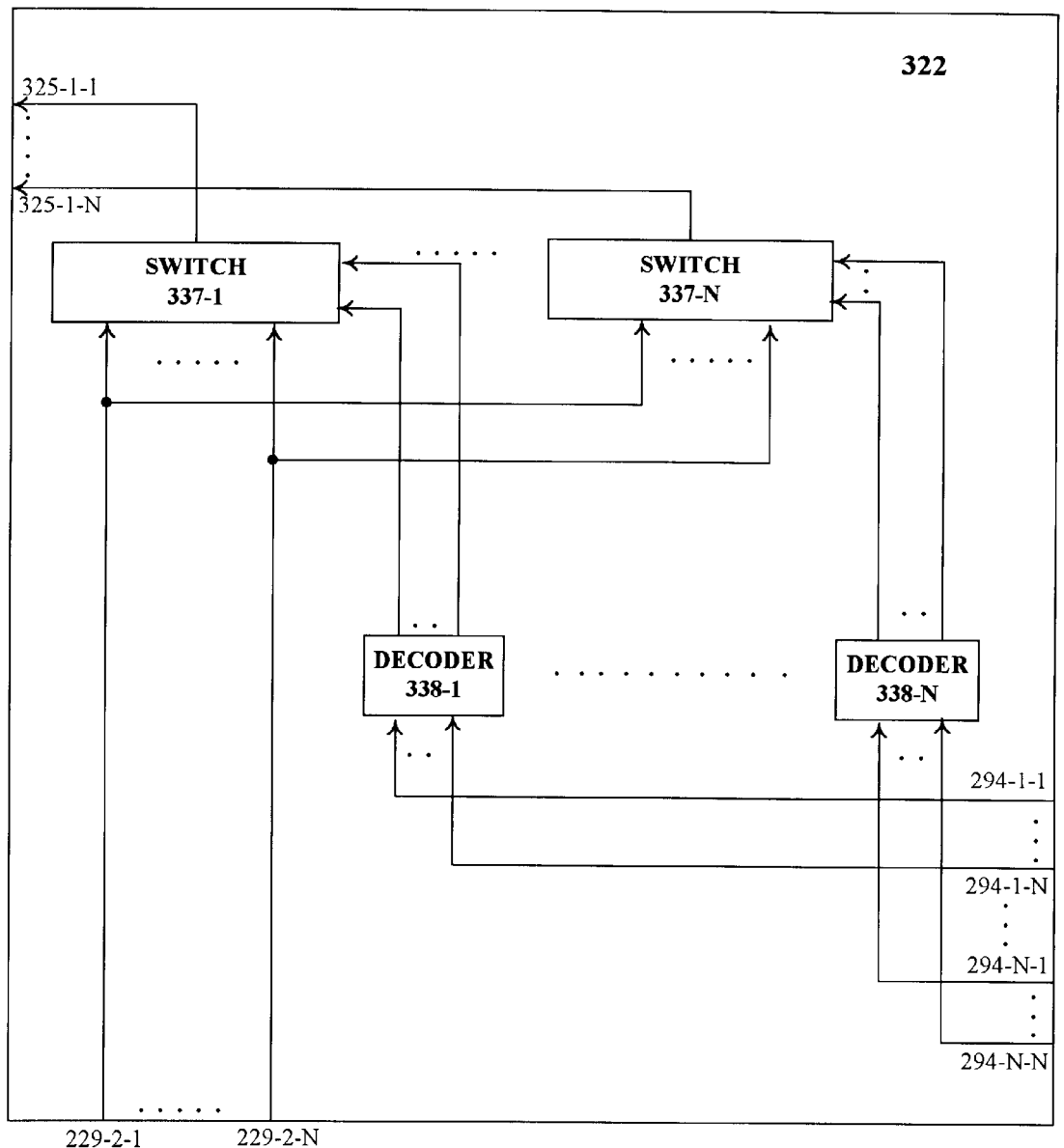
FIG. 21 represents the functional diagram of the input query unit of the switching control block of the auxiliary switch control unit.

Input query receiving unit 322 (FIG. 21) contains a group of control inputs connected with inputs 291-2-1 . . . 291-2-N of the switching control block 279, N groups of inputs of output channel number bits connected with inputs 294-1-1 . . . 294-N-N of the switching control block 279, and a group of control outputs connected with inputs 325-1-1 . . . 325-1-N of priority control unit 321.

The unit 322 (FIG. 21) contains a group of switches 337-1 . . . 337-N and a group of decoders 338-1 . . . 338-N.

Figure 22:
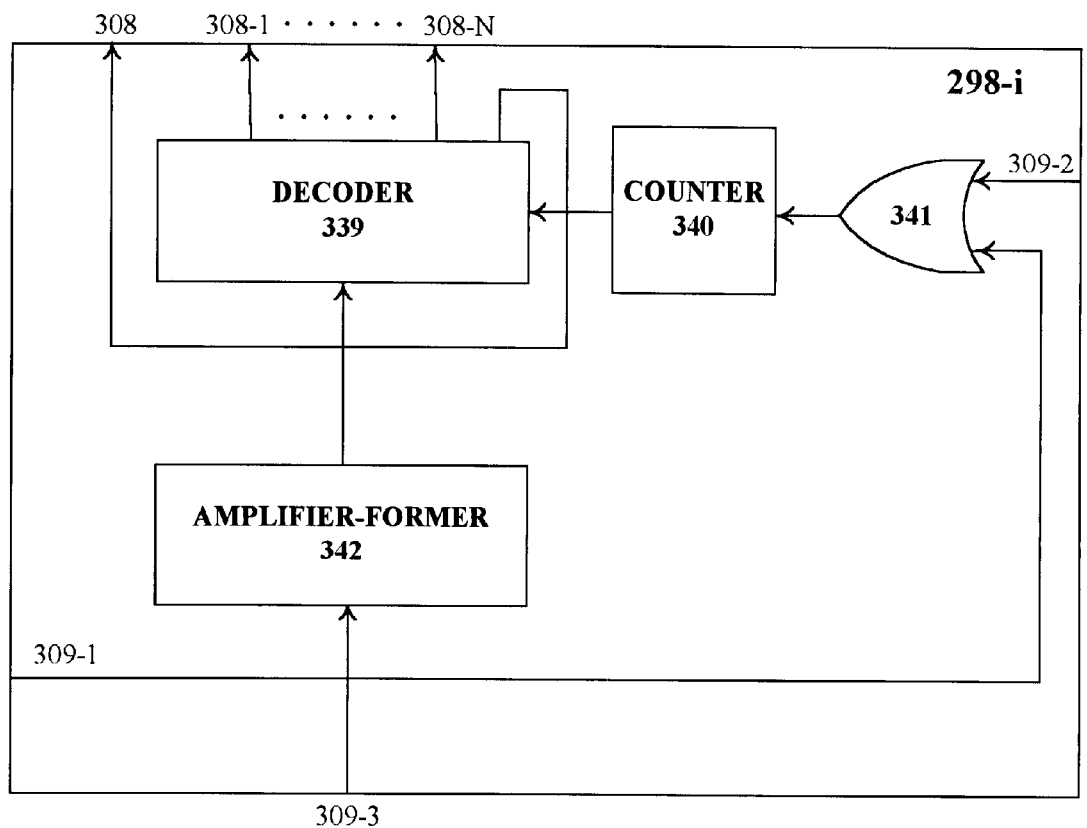
FIG. 22 represents the functional diagram of the transforming-receiving unit of the auxiliary switch switching unit.

Each of the transforming-transmitting units 298-i (FIG. 22) contains decoder 339, counter 340, "OR" element 341 and amplifier-former 342. Each of the transforming-transmitting units 306-i (FIG. 23) contains "OR" element 343, amplifier-former 344, coder 345, counter 346 and "AND" element 347.

Figure 24:
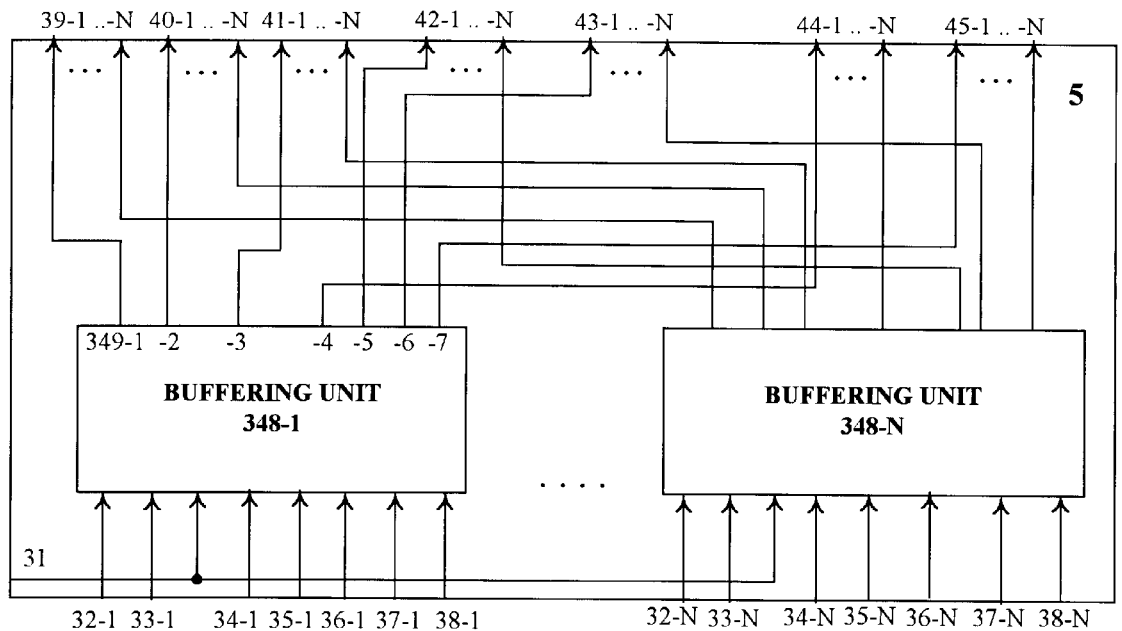
FIG. 24 represents the functional diagram of the computer system buffering block.

Buffering block 5 (FIG. 24) contains group of buffering units 348-1 . . . 348-N.

Each buffering unit 348-i (FIG. 25) contains the first to the fourth control outputs 349-1 . . . 349-4, the first to the third informational outputs 349-5 . . . 349-7, the first and second control inputs connected with the corresponding inputs of the first and second groups of control inputs 32-1 . . . 32-N and 33-1 . . . 33-N, the third control input connected with control input 31, the fourth and fifth control inputs connected with the corresponding inputs of the third and the fourth groups of control inputs 35-1 . . . 35-N and 37-1 . . . 37-N, and the first to the third informational inputs connected with the corresponding inputs of the first, the second and the third groups of informational inputs 34-1 . . . 34-N, 36-1 . . . 36-N and 38-1 . . . 38-N.

Each buffering unit 348-i contains the first and the second buffers 350-1 and 350-2. Buffer 350-1 is used for temporary storage and transmission of instruction words, and buffer 350-2 is used for temporary storage and transmission of operand packets. Both buffers have the same structure and configuration, being different only in internal logic of means of identification of input packet type.

Each buffer 350-1 and 350-2 (FIG. 26) contains the first and the second control inputs 351-1 and 351-2, the first and the second informational inputs 351-3 and 351-4, the third and the fourth control inputs 351-5 and 351-6, external exchange input 351-7, the first and the second transmission control outputs 352-1 and 352-2, informational output 352-3, and external exchange output 352-4.

Each buffer 350-1 and 350-2 contains output switch 353, group of "OR" element 353-1 . . . 353-5, group of "AND" elements 354-1 . . . 354-4, the register memorizing unit (RMU) 355 and the corresponding control unit 356-1 (356-2), input switch 357, and the first and the second input registers 358-1 and 358-2.

Each control unit 356-1 and 356-2 contains control outputs 359-1 . . . 359-12, zeroizing input 360-1, the first input of packet code 360-2, the first control input of receiving 360-3, the second input of packet code 360-4, the second and the third control inputs of receiving 360-5 and 360-6, and the first to the fifth control inputs 361-1 . . . 361-5.

Figure 27:
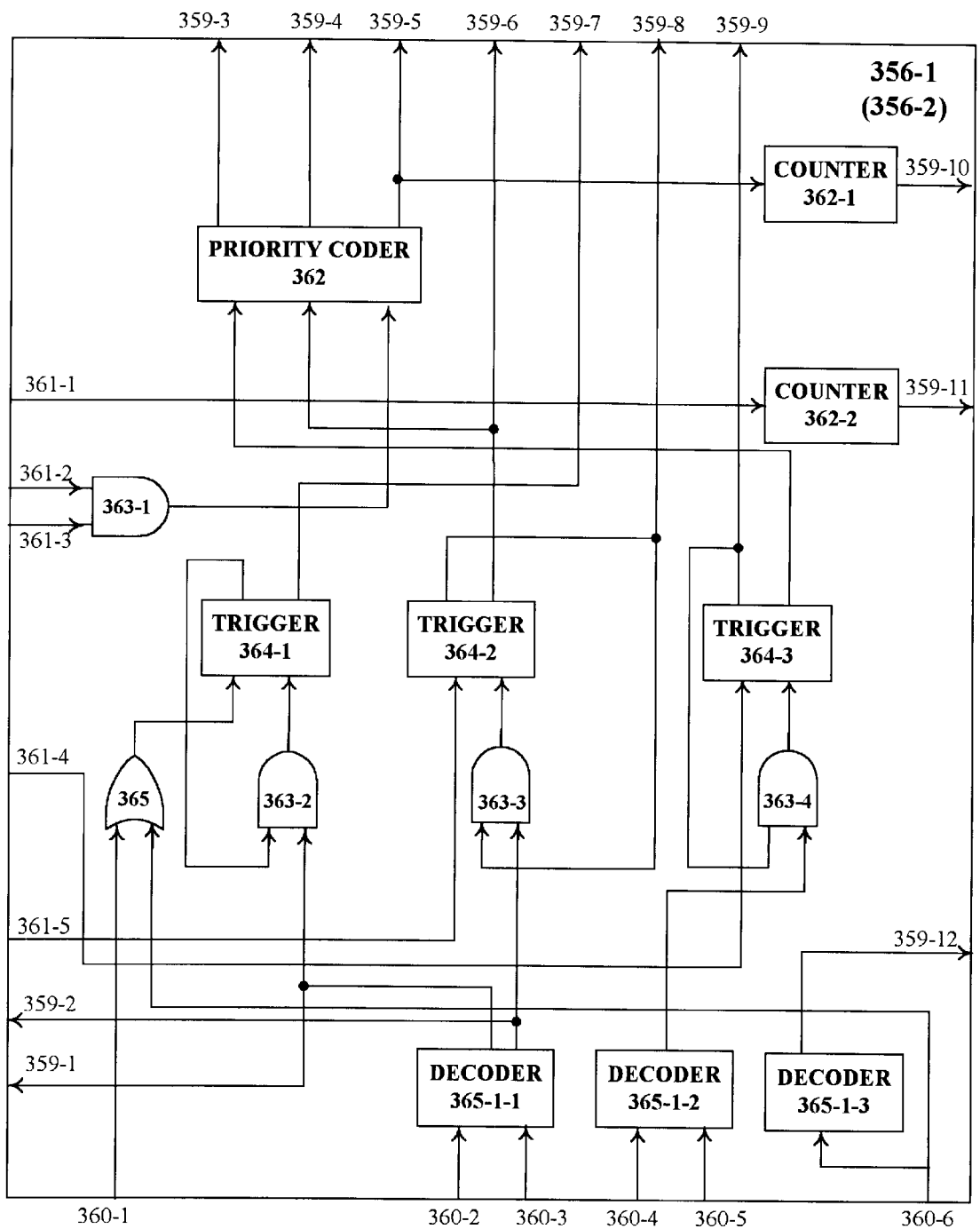
FIG. 27 represents the functional diagram of the buffering control unit of the buffer unit.

Each of the control units 356-1 and 356-2 (FIG. 27) contains priority coder 362, counters 362-1 and 362-2, logical "AND" elements 363-1 . . . 363-4, triggers 364-1 . . . 364-3, logical "OR" element 365, and the corresponding group of decoders 365-1-1 . . . 365-1-3 (or 365-2-1 . . . 365-2-3). The mentioned groups of decoders carry out the function of identification of input packet type and they are different only in the functioning of the inner logic: the group of decoders 365-1-1 . . . 365-1-3 is used for identification of instruction words packets, and the group of decoders 365-2-1 . . . 365-2-3 is used for identification of operand packets.

Figure 28:
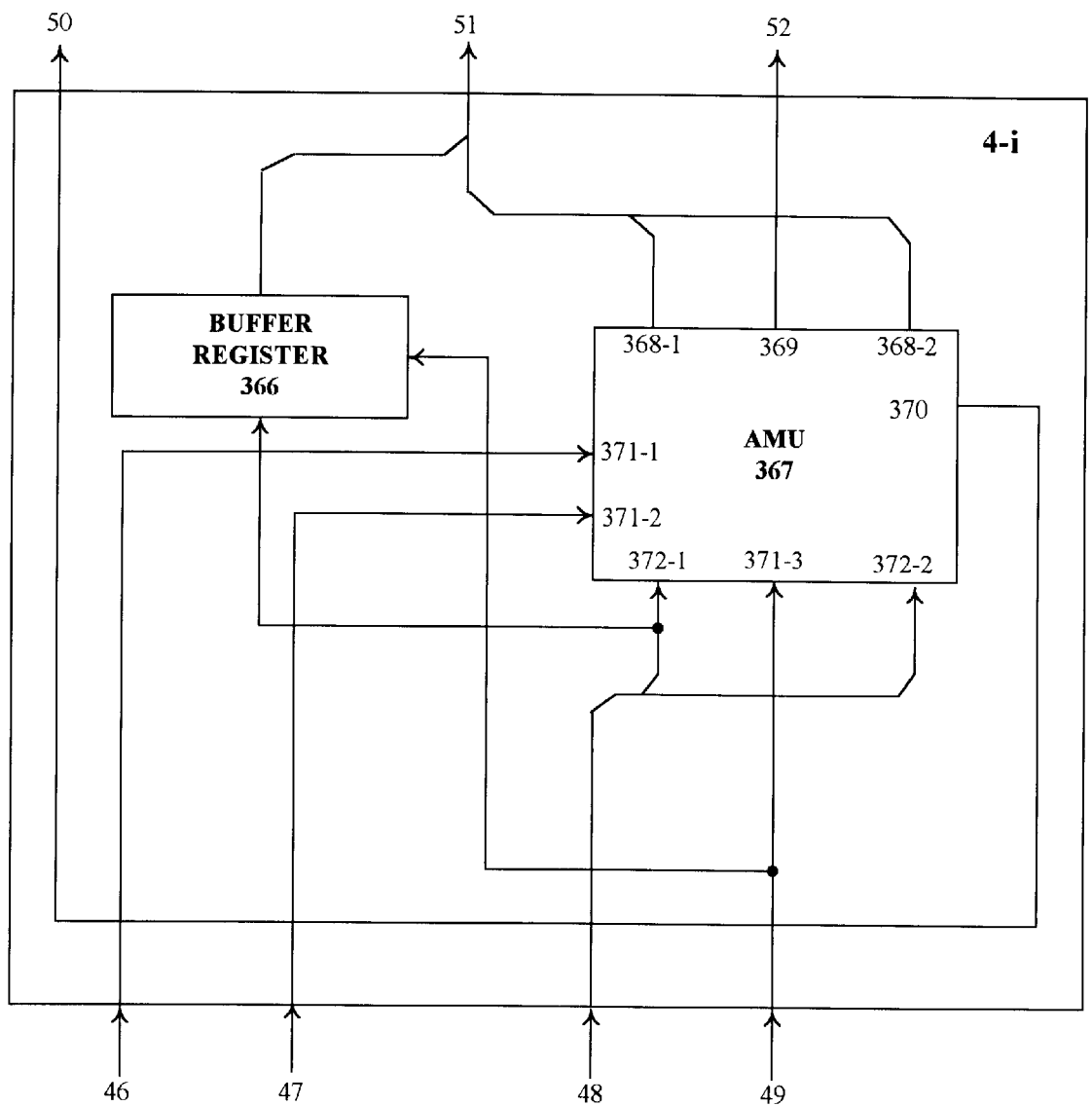
FIG. 28 represents the functional diagram of the computer system associative memory module.

Each associative memory module 4-i (FIG. 28) contains buffer register 366 and associative memorizing unit (AMU) 367, built in analogy with the device (RU, 2035069).

AMU 367 contains the first and the second informational outputs 368-1 and 368-2, the first and the second control outputs 369 and 370, the first to the third control inputs 371-1 . . . 371-3, and the first and the second informational inputs 372-1 and 372-2.

Switch 2 (FIG. 29) contains control unit 373 and switching unit 374, built in analogy with switching unit 263-1 (263-2) included in auxiliary switch 3.

Control unit 373 contains exchange control output 375, a group of control outputs 375-1 . . . 375-N, N groups of control outputs 376-1-1 . . . 376-1-N to 376-N-1 . . . 376-N-N of channel switching, receiving control output 377, zeroizing input 378, and the first to the N-th groups of inputs. Each of the N groups of inputs contains control input 378-1-i, address input 378-2-i, and the first and the second groups of control inputs 379-1 . . . 379-N and 380-1 . . . 380-N.

Switching unit 374 contains a group of informational outputs 381-1 . . . 381-N, a group of informational inputs 382-1 . . . 382-N, N groups of inputs 383-1-1 . . . 383-1-N to 383-N-1 . . . 383-N-N of switching control, a group of control outputs 384-1 . . . 384-N and a group of inputs 385-1 . . . 385-N of receiving control.

Control unit 373 (FIG. 30) contains a group of output query forming triggers 386-1 . . . 386-N, transmission control unit 387, receiving control unit 388, switching control unit 389, a group of query receiving triggers 390-1 . . . 390-N, a group of decoders 391-1 . . . 391-N, a group of input registers 392-1 . . . 392-N and a group of "AND" elements 393-1 . . . 393-N.

Transmission control unit 387 contains N pairs of control outputs, each of which contains the first and the second query set outputs 394-1-1 to 394-1-N and 394-2-1 to 394-2-N, zeroizing input 395, N groups of query control inputs 396-1-1 . . . 396-1-N to 396-N-1 . . . 396-N-N, the first and the second groups of control inputs 397-1 . . . 397-N and 398-1 . . . 398-N.

Receiving control unit 388 contains first control output 399, a group of receiving control outputs 399-1 . . . 399-N, second control output 400, N pairs of inputs containing the first and the second inputs of status transmission 401-1-1 and 401-2-1 to 401-1-N and 401-2-N, a group of control inputs 402-1 . . . 402-N, zeroizing input 403, and N groups of resetting control inputs 404-1-1 . . . 404-1-N to 404-N-1 . . . 404-N-N.

Switching control unit 389 contains N groups of control outputs 405-1-1 . . . 405-1-N to 405-N-1 . . . 405-N-N, N groups of priority control inputs 406-1-1 . . . 406-1-N to 406-N-1 . . . 406-N-N, and a group of control inputs 407-1 . . . 407-N.

Figure 31:
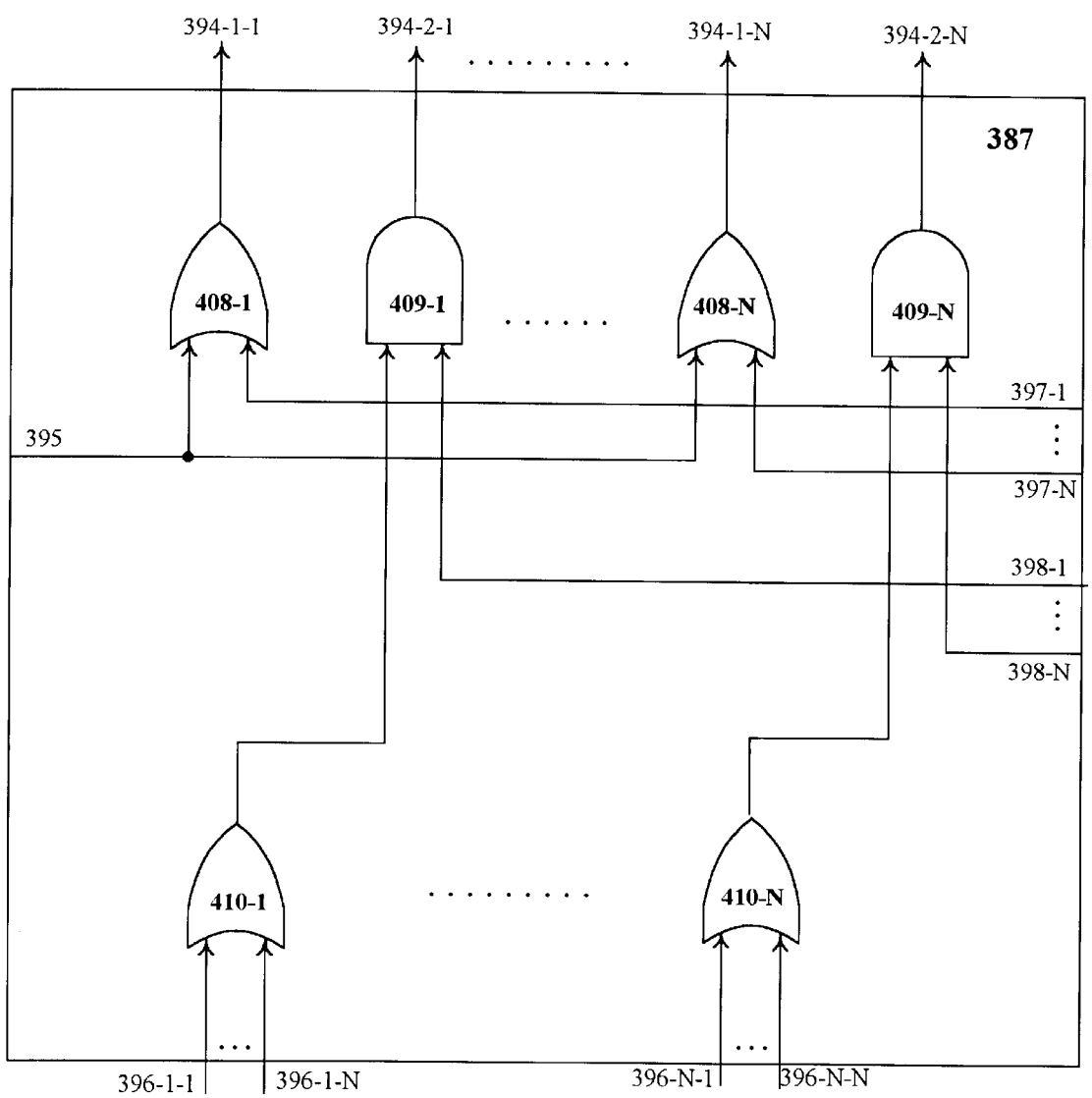
FIG. 31 represents the functional diagram of the transmitting control unit of the computer system switch control unit.

Transmission control unit 387 (FIG. 31) contains the first group of "OR" elements 408-1 . . . 408-N, a group of "AND" elements 409-1 . . . 409-N, and the second group of "OR" elements 410-1 . . . 410-N.

Figure 32:
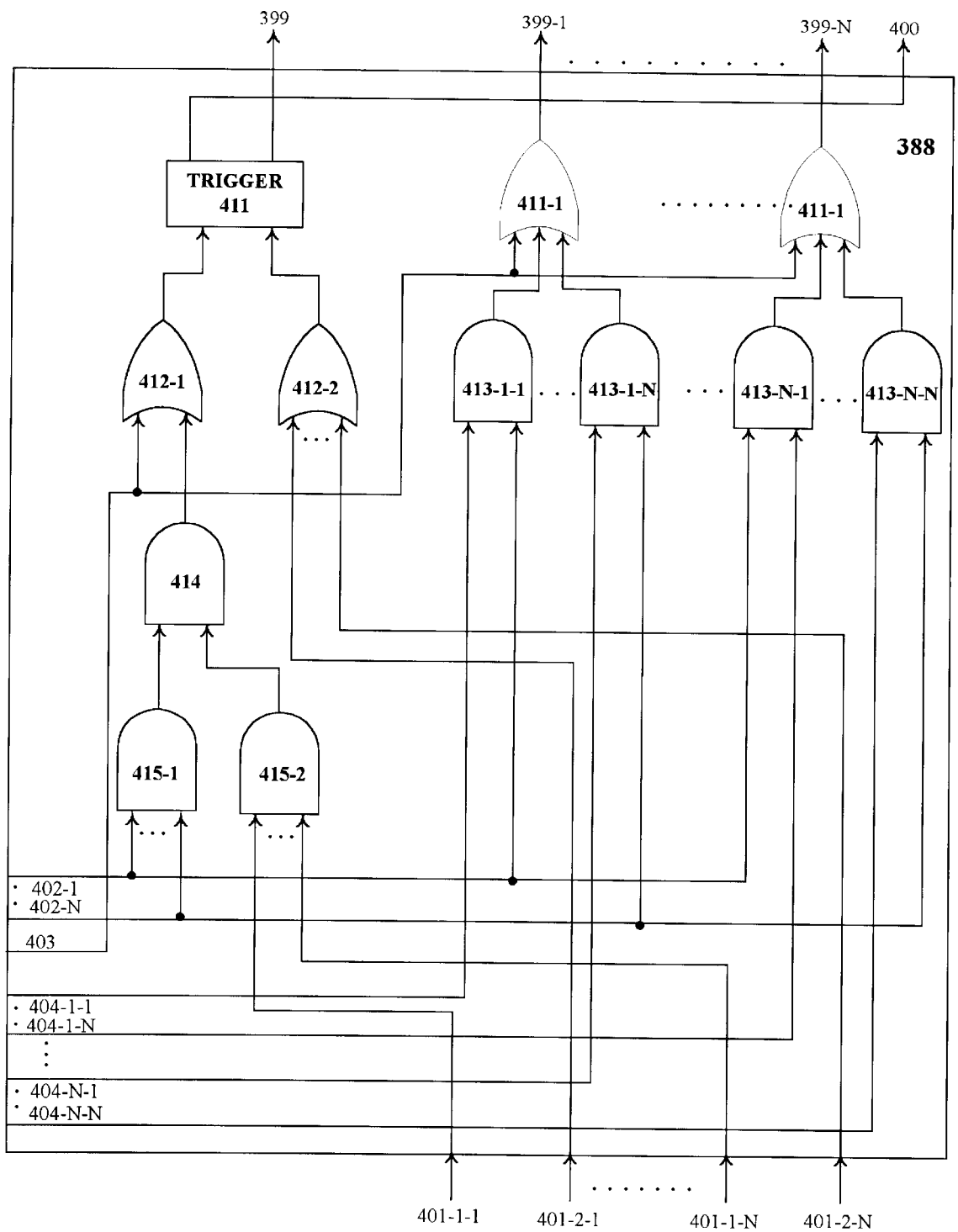
FIG. 32 represents the functional diagram of the receiving control unit of the computer system switch control unit.

Receiving control unit 388 (FIG. 32) contains trigger 411, a group of "OR" elements 411-1 . . . 411-N, the first and the second "OR" elements 412-1 and 412-2, N groups of "AND" elements 413-1-1 . . . 413-1-N to 413-N-1 . . . 413-N-N, and "AND" elements 414, 415-1 and 415-2.

Figure 33:
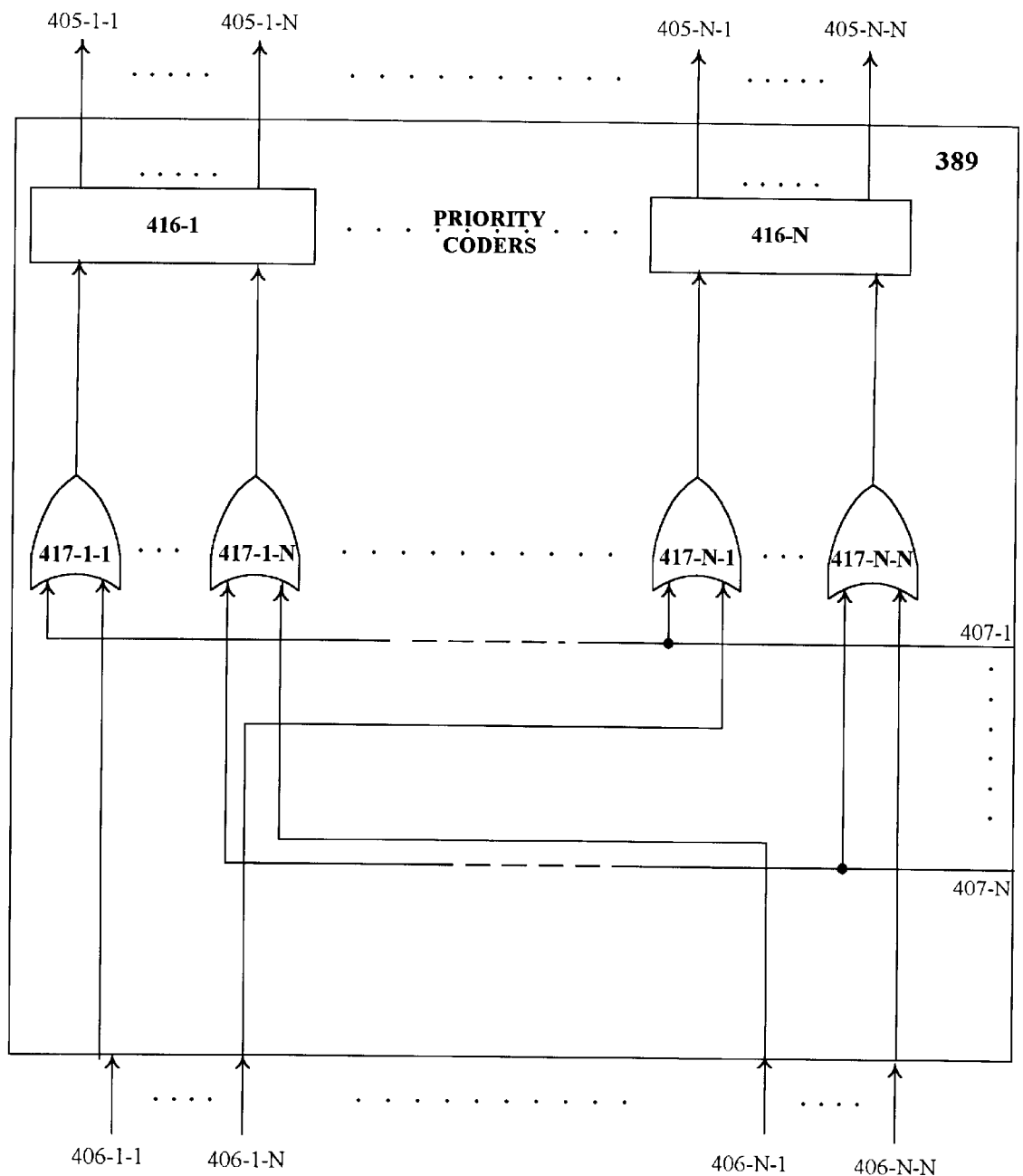
FIG. 33 represents the functional diagram of the switching control unit of the computer system switch control unit.

Switching control unit 389 (FIG. 33) contains a group of priority coders 416-1 . . . 416-N and N groups of "OR" elements 417-1-1 . . . 417-1-N to 417-N-1 . . . 417-N-N.

Figure 34:
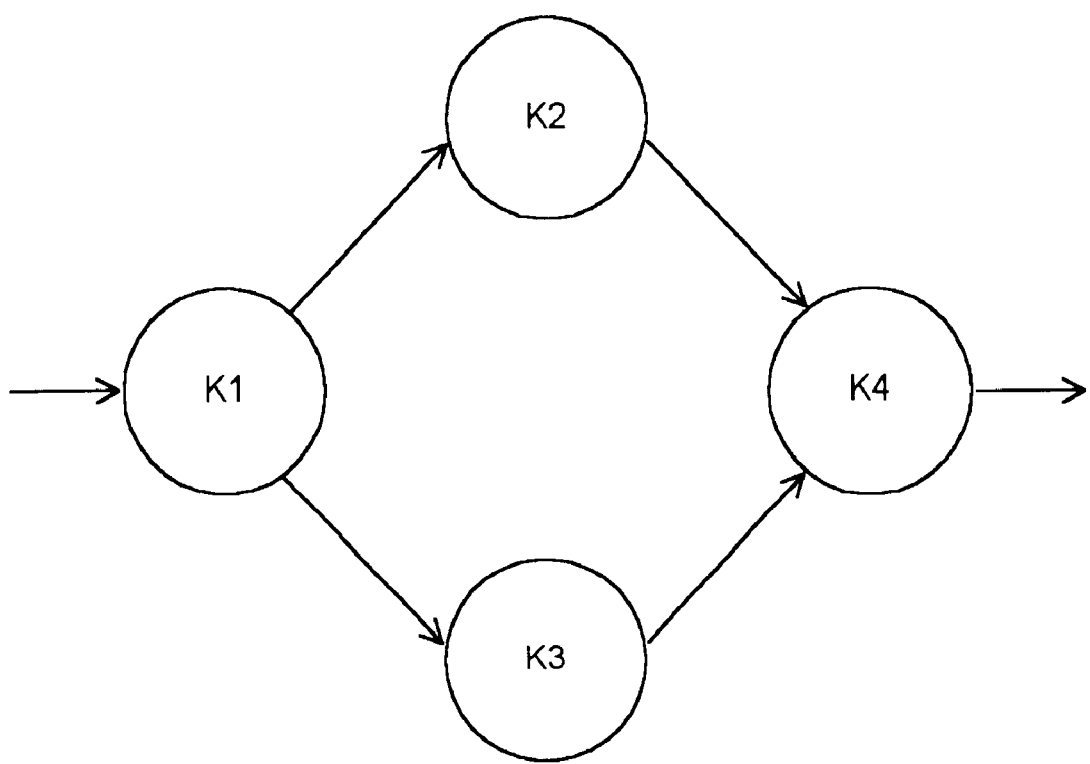
FIG. 34 represents the general appearance of computation graph.

The principles of computational organization under data flow control assume that the algorithm of the problem solution is represented as a graph of the computation process. The graph consists of operations (instructions) on data (operands) and links (directions) by which the data (results) are transmitted from one instruction to another (FIG. 34).

Data processing according to the graph is carried out as the data prepared for processing appear at the instruction inputs. The completion of pairs of data related to a particular instruction is performed in memory, which seeks for them by a key. Generally, a key is a code consisting of instruction number bits, an index, an iteration and so on. The best operational realization of such memory, considering volume and speed, would be based on the utilization of optical elements, and considering an increase in performance, it would be optimal to break its whole volume into separate modules.

Each instruction has a number K-i which can be used to place it in the command memory, a code of operation (COP-i), and a "destination address" K-j to which the result of processing is related.

Furthermore, an instruction has attributes, determining the conditions of its processing or its type. An instruction can be double-input or single-input, depending on how many operands (one or two) it processes, which is determined by the operation code. An instruction can be double-address or single-address, depending on the number of destinations (to the input of how many instructions) to which its result is transmitted. For example, the instruction K-1 (FIG. 34) is a single-input, double-address instruction; the instruction K-4 is double-input, single-address instruction; and the instructions K2 and K-3 are single-address, single-input instructions.

Operations, determined by the COP of a given instruction, can be carried out with numeric data (operands) and with supplementary data (instruction words). The first functional group of instructions is performed by arithmetic operations (operand processing operations), and the second group by the instruction word processing operations.

Figure 35:
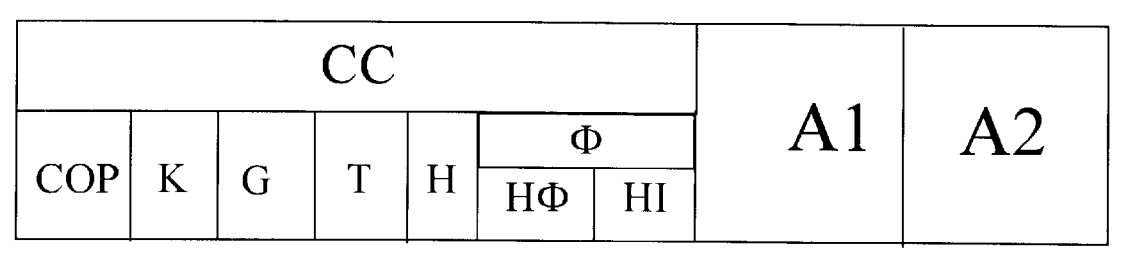

In order to organize the graph processing, instructions and data are represented as informational objects consisting of multi-bit words, where the corresponding groups of bits form the fields with the necessary functional assignment (FIG. 35).

Information processing is carried out by executive devices of two different types, which receive the information in the form of operand packets and instruction words packets. Generally a packet includes a status word and two data words, which either are operands or contain supplementary data. A packet of a single-input instruction contains a status word and only one data word.

A status word contains the following basic groups of functional bits (fields):
  COP—code of operation;
  K—number of instruction;
  G—number of generation;
  T—number of iteration;
  I—index.

The functional fields of a status word can de used in different ways. In particular, the key group of bits for data seeking in the associative memory modules is determined by the fields K, G, T, I. The field COP also may contain bits indicating the instruction type (single- or double-address, single- or double-input) and the packet type (packet of instruction words or packet of operands).

If an instruction has two outputs, then its processing result will be accompanied by two status words, which means two destinations for its transmission.

Bit groups of attributes, determining the type of destination instruction, are stored in command memory and are retrieved with its number and code of operation.

The computer system (FIG. 1) runs the program, which is loaded through the first and the second informational inputs 6 and 7, and returns the result of processing through the second informational output 11. The system realizes its own parallelism of the computational process, represented by the graph, by simultaneously processing all the prepared instructions. In the command memory 105 and 233 for the executive devices 65 and 66 of each of the processor units 1-i, all the instructions of the program being executed are stored. Memory 105 contains all the instructions for instruction word processing, and memory 233 contains all the instructions for operand processing.

Instruction loading (FIGS. 5 and 11) is carried out through the first and the second informational inputs 13 and 14 and the loading switches 107 and 235 respectively, for the executive devices 65 and 66.

The system is started by transmitting starting packets of instruction words and operands from an external (not shown on FIG. 1) system to the third input 8.

The starting packets with the corresponding control signals are transmitted to the inputs of the third group of informational inputs 38-1 . . . 38-N of buffering block 5. The total number of inputs used will be determined by the starting conditions of a particular program.

Buffering block 5 is used to smooth peaks of the input queries on the inputs of the auxiliary switch 3. The use of buffering block 5 in the starting process is its additional function.

Figure 25:
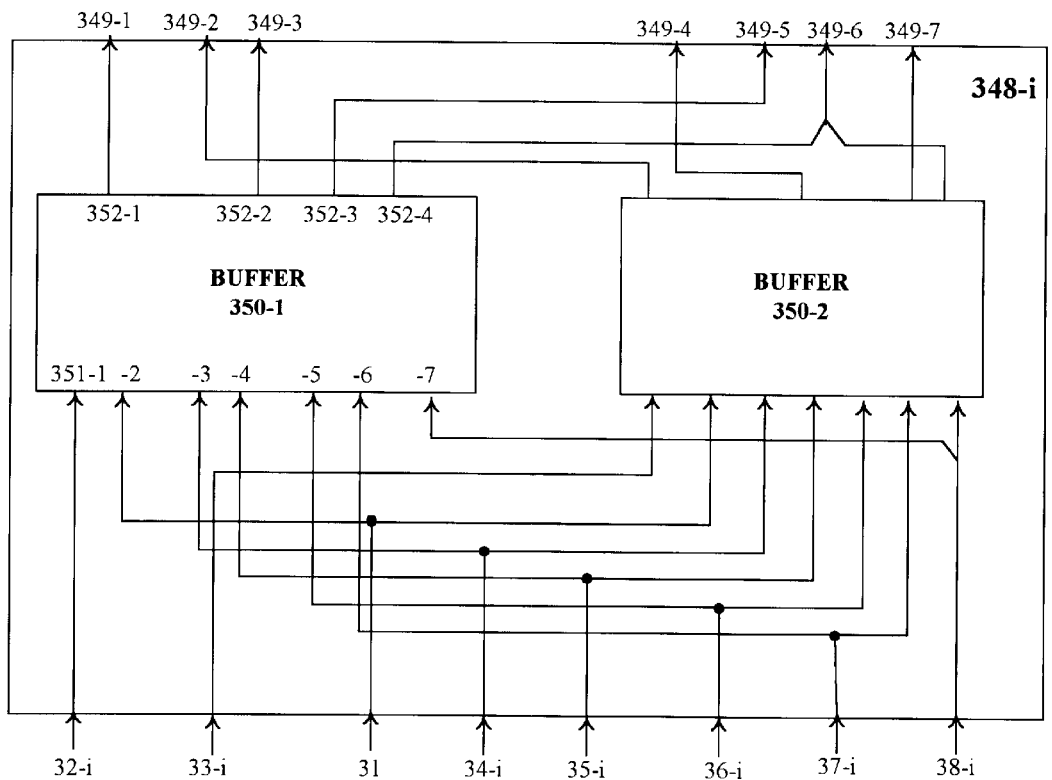
FIG. 25 represents the functional diagram of the buffering unit of the buffering block.
Figure 26:
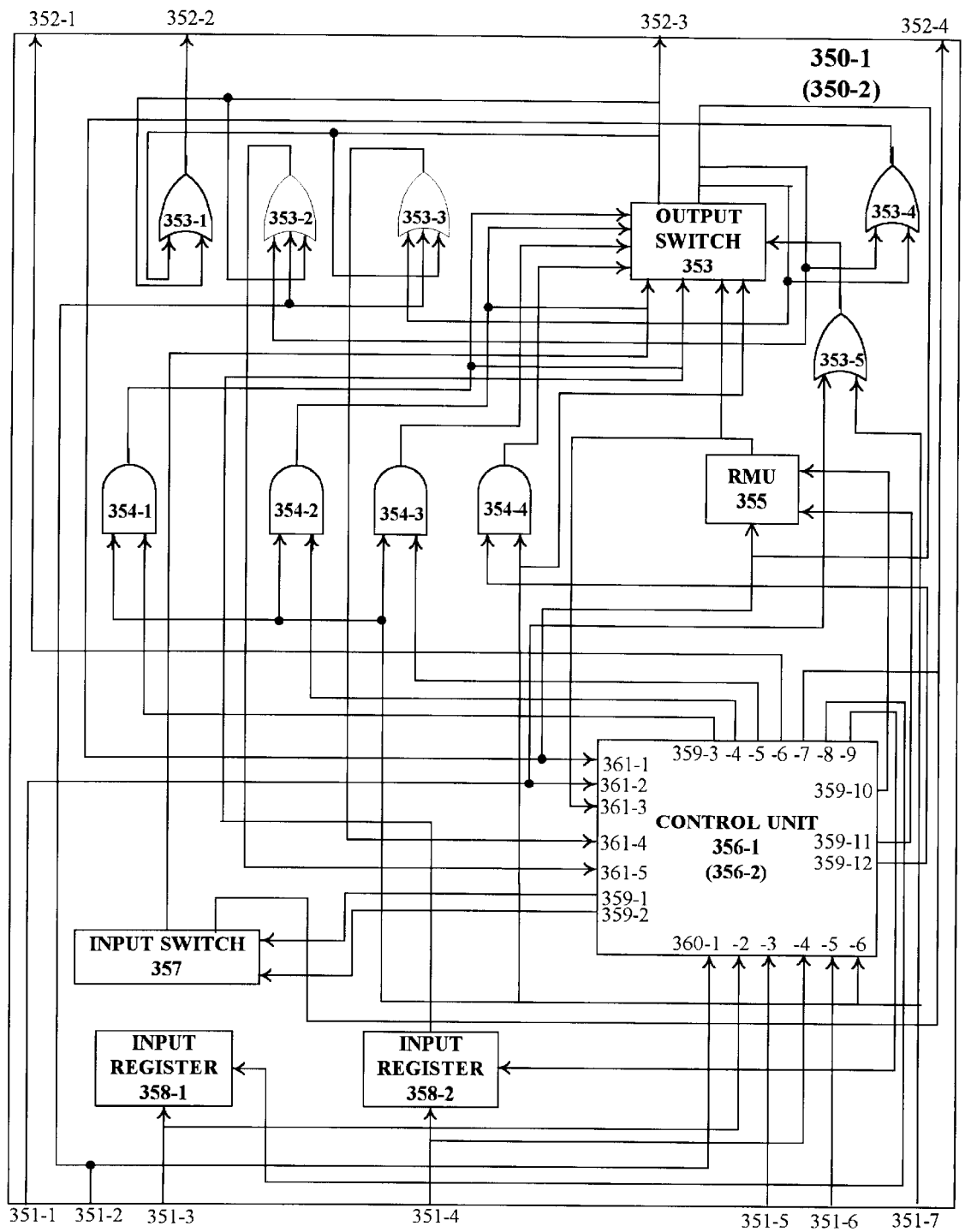
FIG. 26 represents the functional diagram of the buffering unit buffer.

Starting packet bits are transmitted to the informational input of the buffering unit 348-i, which, in this case, conducts the starting functions, and further on to the external exchange input 351-7 of buffers 350-1 and 350-2 (FIG. 25). From the buffers 350-1 and 350-2, the starting packets are transmitted to the fourth informational input of output switch 353 (FIG. 26). The switching in the output switch 353 is controlled through its fourth control input, to which the corresponding signal is transmitted from control output 359-12 of control unit 356-1 (356-2) through the "AND" element 354-4. This control signal is formed (FIG. 27) at the output of the decoder 365-1-3 (365-2-3), to the input of which the coded bit group determining the type of the starting packet is transmitted. Depending on the type of starting packet, the switch 353 control signal will be formed either in buffer 350-1 (for instruction word receiving) or in buffer 350-2 (for operand receiving).

If the starting packet contains operands, then the bits of the packet from output 352-3 of buffer 350-2 are transmitted (through the second informational output of unit 348-i and the i-th output of the third group of informational outputs 45-1 . . . 45-N of buffering block 5) to the i-th input of the second group of informational inputs 27-2-1 . . . 27-2-N of auxiliary switch 3.

The information on the i-th output of the third group of informational outputs 45-1 . . . .45-N of buffering block 5 is accompanied by the strobe of transmission (signal of "significance"), which is a control signal of an exchange query, and is transmitted from the i-th output of the fourth group of the control outputs 44-1 . . . 44-N of buffering block 5 to the i-th input of the fourth group of control inputs 26-1 . . . 26-N of auxiliary switch 3.

The main function of the auxiliary switch is to distribute all received packets over its free outputs.

Figure 15:
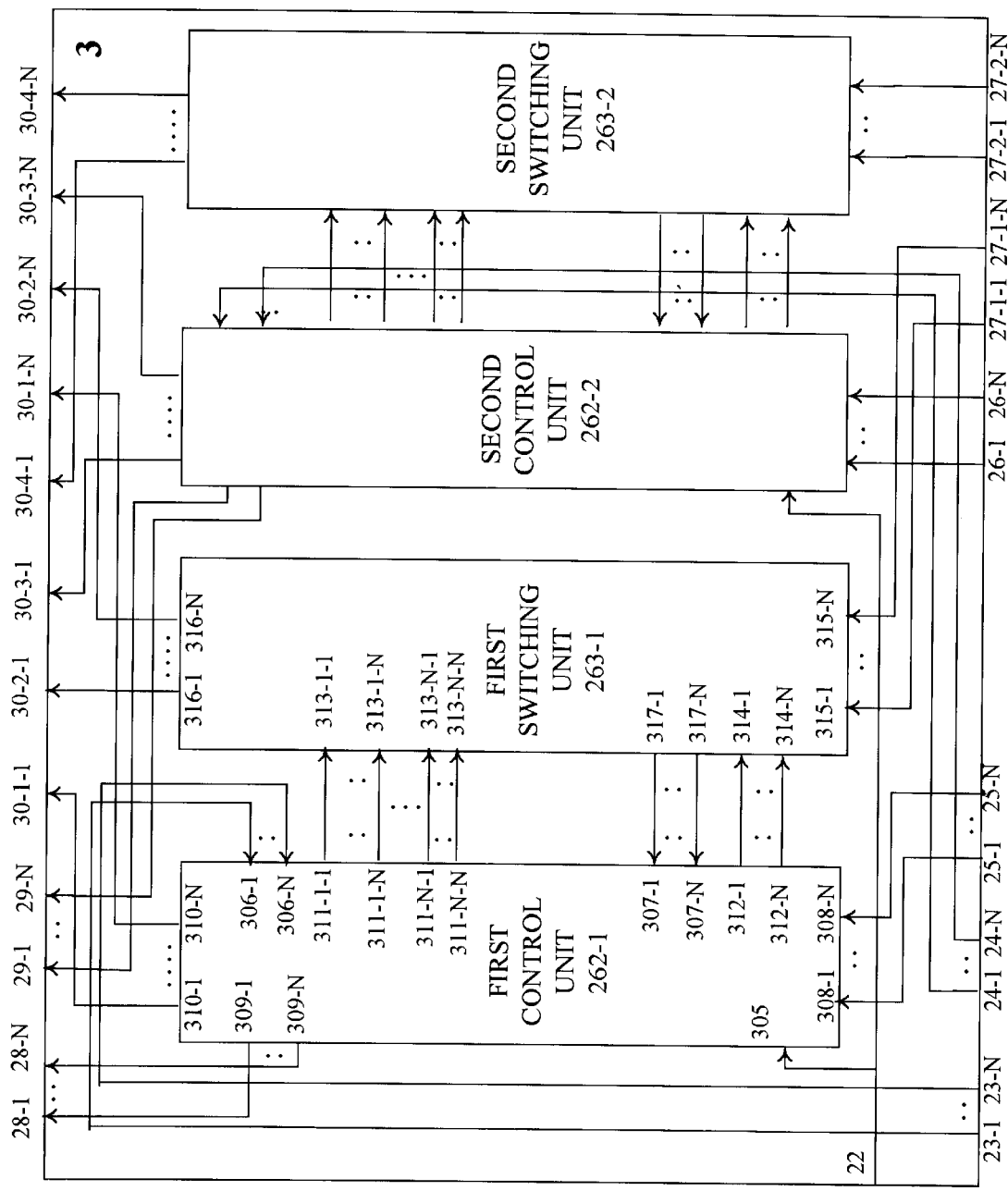
FIG. 15 represents the functional diagram of the computer system auxiliary switch.

Transmission strobe and the bits of the operand packets, transmitted respectively to the i-th inputs of the fourth group of control inputs 26-1 . . . 26-N and to the i-th inputs of the second group of the informational inputs 27-2-1 . . . 27-2-N of the auxiliary switch, are transmitted respectively to the control inputs 265-i of control unit 262-2 and the informational inputs 274-i of switching unit 263-2 (FIG. 15, 16, 17).

Operand packet bits, transmitted to input 274-i of switching unit 263-2, are received by input register 307-i. The signal of receiving control is formed at output 271-i of control unit 262-2.

The switching, including the transmission of packet bits from input 264-i of switching unit 263-2 to its informational output 275-j, corresponding to the first free output register from the group 297-1 . . . 297-N, is carried out with the help of a spatial optical system.

From the output of register 307-i, the parallel code of the packet bits is transmitted to inputs 312-1 . . . 321-N of transforming-transmitting unit 306-i. Serial code, formed on output 310, is transmitted to the laser emitter 305-i. The laser signal corresponding to the serial code (through the optical system, which includes the controlled deflector 304-i, a group of optical lens rasters 303-1 . . . 303-N, controlled optical transparency 302, and a group of optical lens rasters 301-1 . . . 303-N) is transmitted to the input of photo-receiver 300-j. From the output of photo-receiver 300-j, the serial code of the input packet is transmitted to the informational input 309-3 of the transforming-transmitting unit 298-j. A parallel code corresponding to the bit groups of the packet input at 274-i of switching unit 263-2 is formed on the outputs of register 297-j. And, a signal which determines the end of the formation of the output parallel code is formed on the output 308 of the unit 298-j.

Switching unit 263-2 (FIG. 17) provides information transmission from any input 274-1 . . . 274-N to any output 275-1 . . . 275-N. The transmission is determined by a free register from the register group 297-1 . . . 297-N, which means "free address" switching regime. Signals controlling the corresponding information transformation and switching of the spatial optical system are transmitted to inputs 272-1-1 . . . 272-N-N of switching unit 263-2 from outputs 270-1-1 . . . 270-N-N of control unit 262-2 (FIG. 15).

Figure 16:
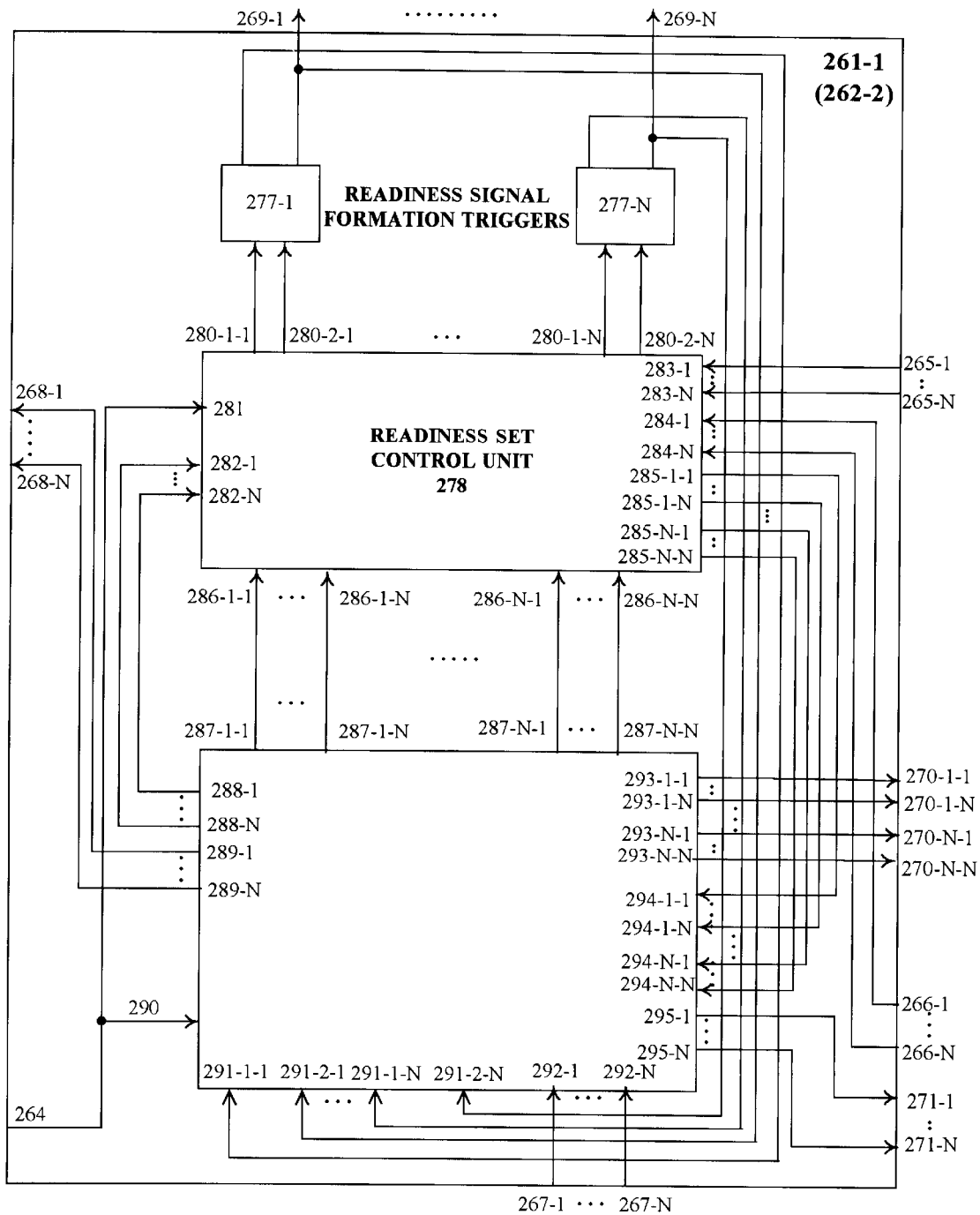
FIG. 16 represents the functional diagram of the auxiliary switch control unit.

The formation of the signals mentioned (FIG. 16, 19, 20) is carried out in switching control block 279 when the strobe of transmission is transmitted to input 292-i from input 267-i of control unit 262-2. The strobe of packet transmission, which is formed at trigger 277-j of the group of readiness signal forming triggers, is transmitted to output 269-j of control unit 262-2 (FIG. 16).

Instruction word packet transmission is carried out in the same way with the use of identical functional structures of the buffering block 5 and the auxiliary switch 3.

Figure 2:
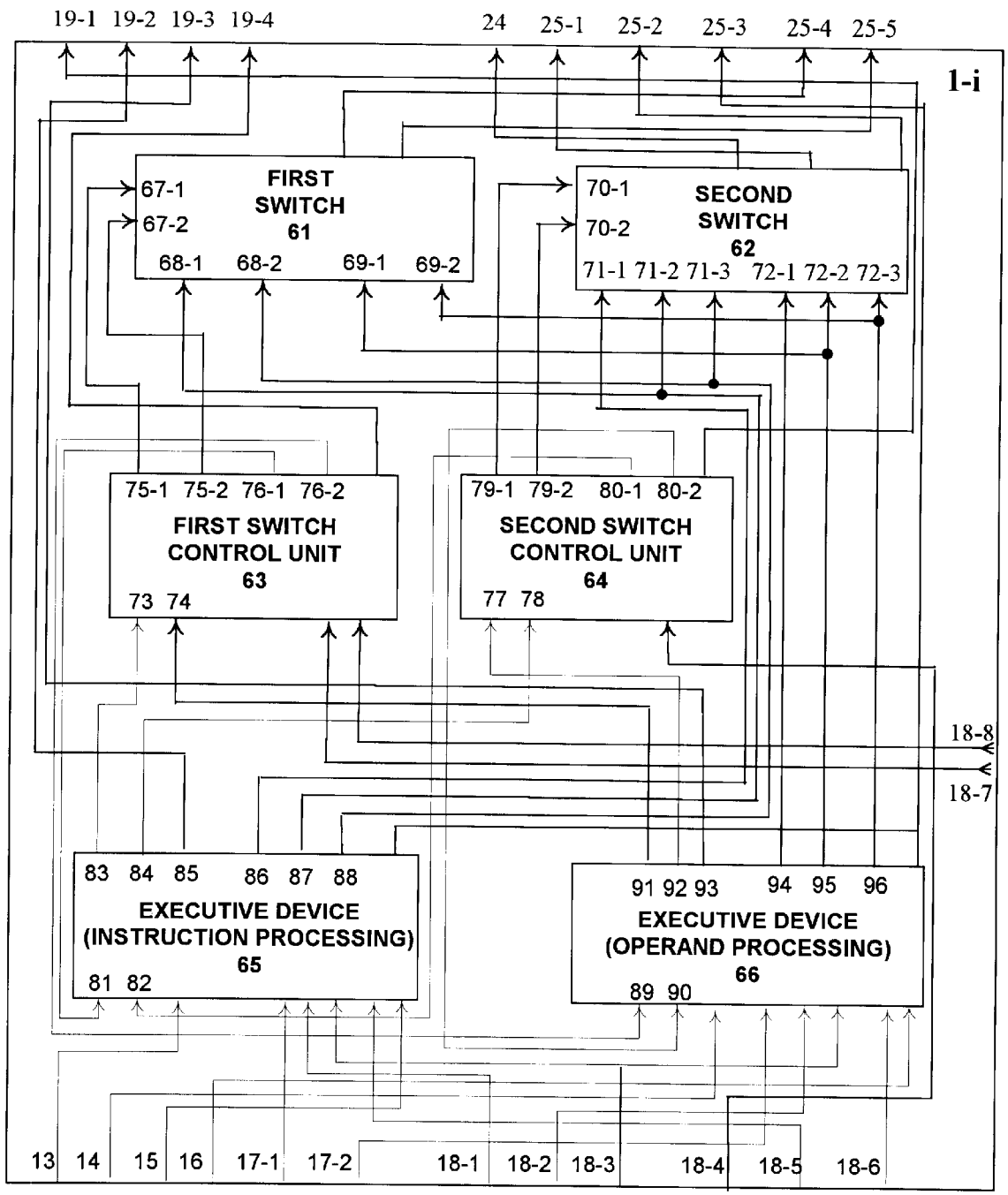
FIG. 2 represents the functional diagram of the computer system processor unit.

The strobe of transmission and the bits of the operand packet are transmitted, respectively, through outputs 30-3-j and 30-4-j of auxiliary switch 3 to inputs 18-6 and 16 of the processor unit 1-j (FIG. 1) and to the corresponding inputs of the executive device 66 (FIG. 2).

The strobe of transmission is transmitted through the corresponding input of executive device 66 to input 237-4 of control unit 230 (FIG. 11) and the bits of the operand packet are transmitted to informational input 241-2 of input register unit 236.

Functional fields of the operand packet (FIG. 13) are received by the status word register 257 and the operand registers 258-1 and 258-2 after the signal of receiving control is received at input 241-1 of input register unit 236. The bits of the instruction number are transmitted from output 242-1 of input register unit 236 through the first informational input of loading switch 235 to the address input of command memory 233. The starting control signal is transmitted from output 238-5 of control unit 230 to the retrieval control input of command memory 233.

The operation code bits and the operand bits, accompanied by the starting control signal, are transmitted from outputs 242-2, 242-3 and 242-4 of input register unit 236 to the corresponding inputs of the ALU 234. The bits of the functional fields of G, T, I are transmitted to input 239-6 of output register unit 232. The bits of functional fields containing the operation code and the instruction number for which the result of computations is destined are transmitted from the informational output of command memory 233 to input 239-5 of output register unit 232. This result is transmitted to the input 239-4 of the unit 232.

Inputs 239-1, 239-2 and 239-3 of output register unit 232 receive the corresponding signals which control the reception of the ALU result to the register 259, the bit fields K and COP of the subsequent instruction to the registers 260-1 and 260-2, and the bit fields G, T, and I to the register 261. The functional fields of the result of the current instruction processing (sub-packet) are formed on the outputs 240-1, 240-2 and 240-3 of the output register unit 232. These fields reflect the principles of computation represented by the computation graph and are transmitted respectively to the first informational input 95 of executive device 66 and to the informational inputs of output switch 231. Control signals are transmitted from outputs 238-1 and 238-2 of control unit 230 to the control inputs of output switch 231. The output of switch 231 is connected with address output 94 and the second informational output 96 of executive device 66. The output 94 receives an informational field, corresponding to a group of lower bits of the instruction number, which is placed on the register 260-1 (260-2). This group of bits identifies the number of the associative memory module, from the group of modules 4-1 . . . 4-N, allowing the sub-packets to be distributed evenly over the associative memory modules. The functions of the output switch 231 are determined by the presence of double-address instructions, i.e. the instructions, the processing result of which is the input operand for two following instructions having different number and operation codes. This condition is realized by having two output registers 260-1 and 260-2 of instructions, the content of which is sequentially transmitted through switch 231 to outputs 94 and 96 accompanying the result, which is transmitted to the output 95.

The output switch 231 control signals are formed after the functional fields of the type of instruction and of the strobe of transmission are transmitted from the informational and control outputs of the command memory 233 to the inputs 237-5 and 237-6 of the control unit 230 respectively. The signal of significance of the result is transmitted from the informational output of the ALU to the input 237-7.

The functional fields of the instruction type include the following attributes: 1A (single-address instruction), 2A (double-address instruction), 1B (single-input instruction), 2B (double-input instruction), which are transmitted (FIG. 12) to the triggers 254-2 . . . 254-5. The status of the triggers influences the formation of the control signals on the outputs 238-1 and 238-2 of the control unit 230. The transmission strobes, corresponding to the regimes of the single- or double-input instructions, are formed on the first and second control outputs 91 and 92 of the executive device 66. And, corresponding to these regimes, bits of the functional fields of the sub-packet are formed on the first and the second informational outputs 95 and 96.

In the single- and double-input instruction regimes, the bits of the sub-packet are transmitted from the outputs 95 and 96 to the outputs 21-4, 21-5 and 21-1 and 21-2 of the j-th processor unit respectively through the switches 61 and 62, which are controlled through the outputs 75-1 and 75-2 of the unit 63 and through the outputs 79-1 and 79-2 of the unit 64. The control signals are formed after the input 74 of the unit 63 and input 77 of the unit 64 receive the strobes of transmission respectively from the outputs 91 and 92 of the executive device 66. Information regarding the number of the associative memory module is transmitted from output 94 of the executive device 66 to the address output 20 of the processor unit only in the double-input instruction regime, since running a single-input instruction does not require searching for a second operand.

Figure 29:
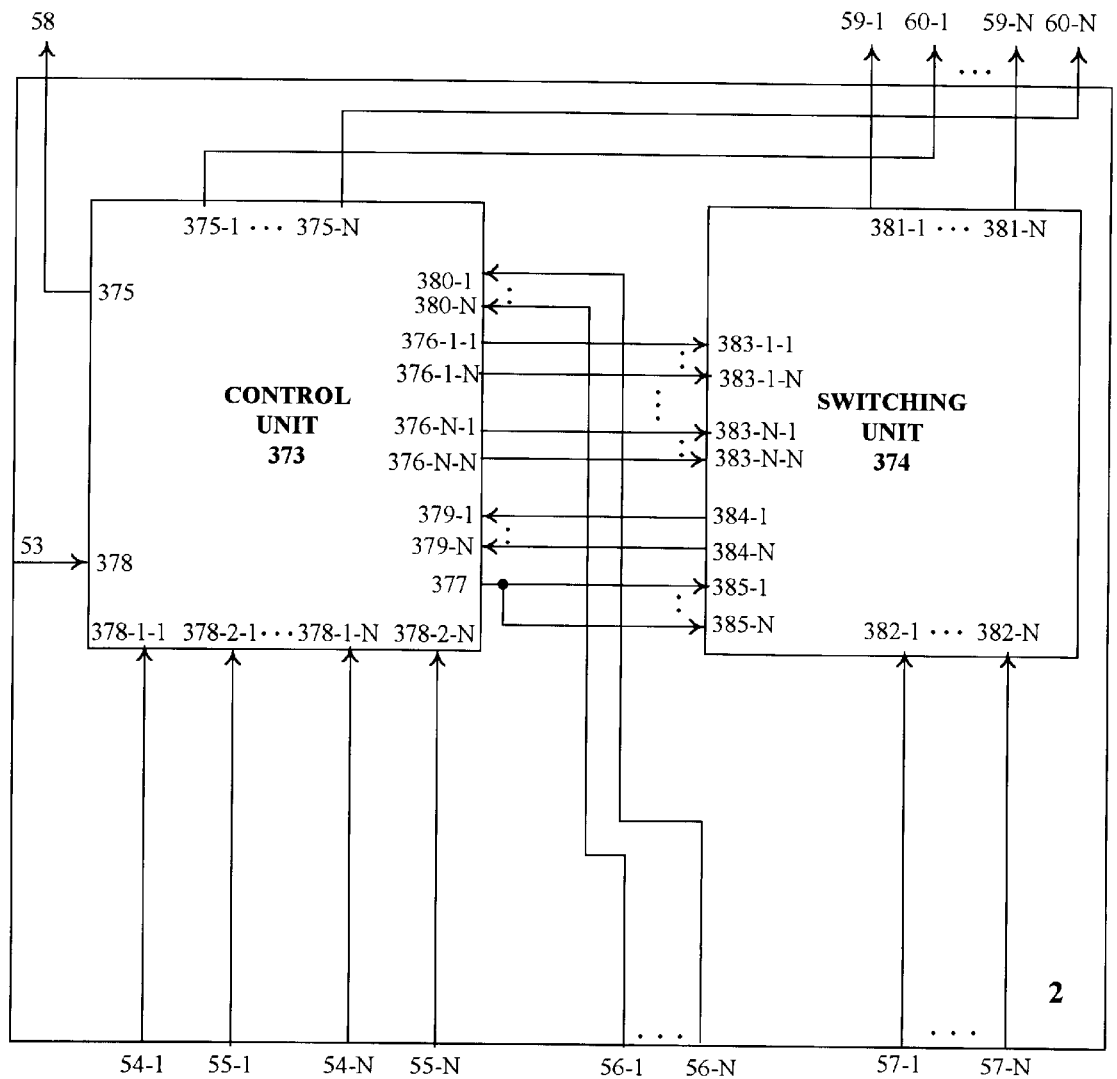
FIG. 29 represents the functional diagram of the computer system switch.

When the result (operand) output from the corresponding executive device is one for a double-input instruction, the search for the pair operand is conducted in an associative memory module. The number of the particular module (further on referred to as "address") is determined by the bit group on the output 20 of the processor unit. Access to the group of associative memory modules 4-1 . . . 4-N is realized by means of the switch 2 (FIG. 29).

Here, the j-th inputs of the first group of control inputs 54-1 . . . 54-N, a group of address inputs 55-1 . . . 55-N, and the second group of control inputs 57-1 . . . 57-N of the switch 2 receive control signals, the number of the memory module and the functional fields of the sub-packet from the outputs 19-1, 20 and 21-1, 21-2 of the j-th processor unit respectively.

The switch 2, which includes control unit 373 and switching unit 374, provides data transmission, unlike the switch 3, to a "fixed" address on the output as determined by the given number k of the associative memory module.

Figure 30:
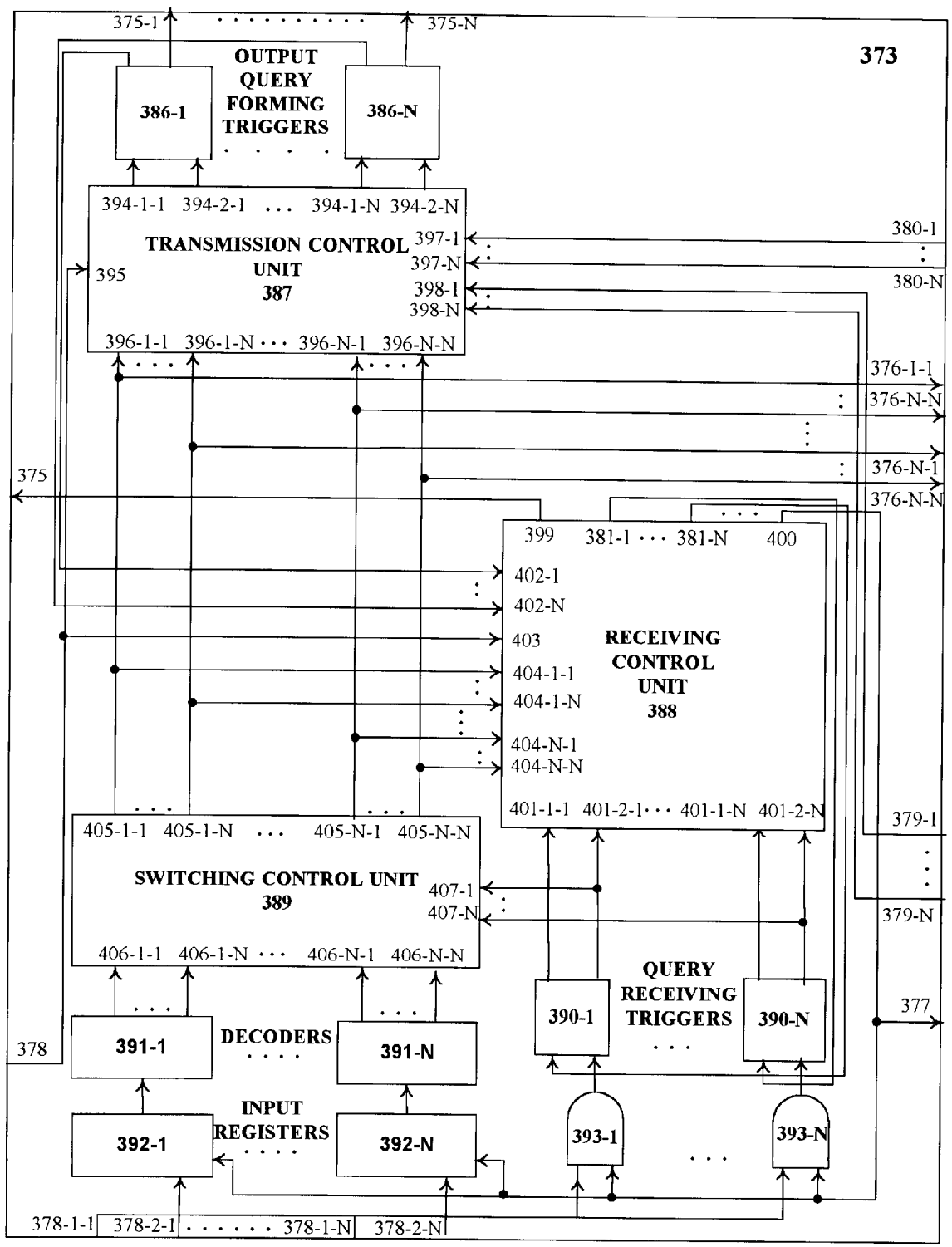
FIG. 30 represents the functional diagram of the computer system switch control unit.

The switching conditions are realized in the control unit 373 (FIG. 30). Inputs 378-1-j and 378-2-j of control unit 373 receive the corresponding control information from inputs 54-j and 55-j of switch 2. Then, the following operations are carried out: the address is received in register 392-j, query trigger 390-j is set, a position code corresponding to the k-th associative memory module is formed at the k-th output of the decoder 391-j and these signals are transmitted to the inputs 407-1 . . . 407-N and 406-1-1 . . . 406-N-N of switching control unit 389. Switching control signals are formed at outputs 405-1-1 . . . 405-N-N of switching control unit 389 and are transmitted to outputs 376-1-1 . . . 376-N-N of control unit 373.

The mentioned signals are formed at the outputs of priority coders 416-1 . . . 416-N (FIG. 33), which play the part of priority schemes, realizing the queuing of queries to each of the associative memory modules.

The control signals from the outputs 376-1-1 . . . 376-N-N of the control unit 373 are transmitted to a group of switching control inputs 383-1-1 . . . 383-N-N of the switching unit 374 The structure and functioning of switching unit 374 are fully similar to those of the switching units 263-1 and 263-2 of switch 3. Here, input 383-j-k of switching unit 374 receives a signal controlling the k-th input of the j-th deflector from the group 304-1 . . . 304-N (FIG. 17), and the output 59-k of switch 2 receives bit fields corresponding to those received at informational input 57-j of switch 2. The corresponding transmission strobe is formed at trigger 386-k (FIG. 30) and is transmitted through output 375-k of control unit 373 to output 60-k of switch 2.

Bits of the functional fields of the sub-packet and the transmission strobe are transmitted from the outputs 59-k and 60-k of the switch 2 to the inputs 48 and 49 of associative memory module 4-k. The bit field of the status word (as a key for associative seeking),and the bit fields of the operand and the transmission strobe are transmitted respectively to inputs 372-1, 372-2 and 371-3 of the associative memorizing unit (AMU) 367. The bit field of the status word is also transmitted to the informational input of the buffering register 366. The control input of the buffering register 366 receives the transmission strobe from the second control input 49 of the associative memory module.

A sub-packet which does not have a pair "stays" in memory.

When the AMU contains the corresponding pair operand, the bit fields of the first and the second operands are formed at outputs 368-1 and 368-2. The bit fields of the first and the second operands, together with the bit field of the status word (at the output of register 366), are transmitted to the informational input of the associative memory module 4-k. The second control output 92 of the associative memory module 4-k receives the transmission strobe, formed at the first control output 369 of the AMU 367.

Having been formed at the informational output 51 of the associative memory module k, the ensuing packet is transmitted to input 36-k of buffering block 5 and then to the corresponding input of the buffering unit 348-k. Input 37-k of the buffering unit 348-k receives the transmission strobe from the second control input 52 of the associative memory module 4-k through the corresponding input of buffering block 5.

If the received packet is an operand packet, its functional fields bits are received by the register 358-2 of the buffer 350-2, and the corresponding receiving control signal is formed at output 359-9 of control unit 356-2.

From the output of register 358-2 the bit fields of the packet are transmitted to the second informational input of switch 353. The corresponding control input of switch 353 receives the signal of switching control from the output of "AND" element 354-1. The signal of switching control is transmitted together with the bit fields of the packet to the first input of the switch 353, which plays the part of transmission strobe, which is completed at the output of the "OR" element 353-1.

If the corresponding input register 307-k is free in switching unit 263-2 of switch 3, then the input 27-2-k of switch 3 receives a packet of operands from the first output of switch 353 through output 352-3 of buffer 350-2, through output 349-6 of the buffering unit 348-k and through output 45-k of block 5. Respectively, the transmission strobe is transmitted to input 26-k of switch 3 from the output 44-k of buffering block 5 and the ensuing processing cycle is run.

When reception by switch 3 is closed, in the case when register 307-k is busy, a signal blocking transmission is transmitted from the switching unit to the input 33-k of the buffering block 5. The signal blocking transmission is transmitted through the corresponding input of the unit 348-k to input 351-1 of buffer 350-2 and then to input 361-2 of control unit 356-2 and the input of "OR" element 353-5. At the output of the "OR" element the control signal is formed. The control signal is transmitted to the fifth control input of switch 353. Information transmitted through the second output of switch 353 is accompanied by the loading signal from the output 359-11 of the control unit 356-2 and is transmitted to an input of the RMU 355. Information loading to RMU 355 will be carried out until the blocking signal is cleared from input 33-k of buffering block 5. When the signal is cleared and if there is no information at the registers 358-1 and 358-2 and at the fourth informational input of the switch 353, the bits of the packet are transmitted from RMU 355 through the third informational input of switch 353 to output 352-3 of the buffer 350-2 and to the corresponding input 45-k of buffering block 5, and through the corresponding inputs and outputs of switch 3 to the fourth informational input 16 of the k-th processor unit.

If the result, obtained in executive device 66, does not require a search for the corresponding pair, which is determined by the single-inputness of the instruction, then the result of processing and the corresponding strobe of transmission are transmitted from the corresponding outputs of the switch 61 and the control unit 63 (FIG. 2) to outputs 21-4, 21-5 and 19-4 of the k-th processor unit respectively. The bit fields of the result and the corresponding control signals are formed similarly to the result of the double-input instruction. The sub-packet bits and the strobe of transmission are transmitted to the inputs 34-k and 35-k of buffering block 5.

If the transmitted sub-packet is an instruction word, it is received by the register 358-1 of the buffer 350-1. The corresponding control signal is formed at output 369-8 of control unit 356-1. The bits of the sub-packet are transmitted from the output of register 358-1 to the informational input of switch 357. From the first informational output of switch 357, the bits of the sub-packet are transmitted to the first informational input of switch 353. The corresponding signal of switching control is formed at the output of "AND" element 354-2 and is received by the first control input of switch 353. A control signal is transmitted from output 359-4 of the control unit 356-1 to an input of the "AND" element 354-2 (FIG. 26, 27).

The second informational output of switch 357 is used for transmission of the computing result to the external controlling system. The corresponding control signal is formed at the first output of the decoder 365-1. The input of decoder 365-1 receives the bits of the code determining the type of the sub-packet. Information from the second informational output of switch 357 together with the strobe of transmission from output 359-7 of control unit 356-1 is transmitted to output 352-4 of buffer 350-1 and through output 349-7 of the unit 348-k and the output 43-k of block 5 to the second informational output 11 of the system.

Figure 5:
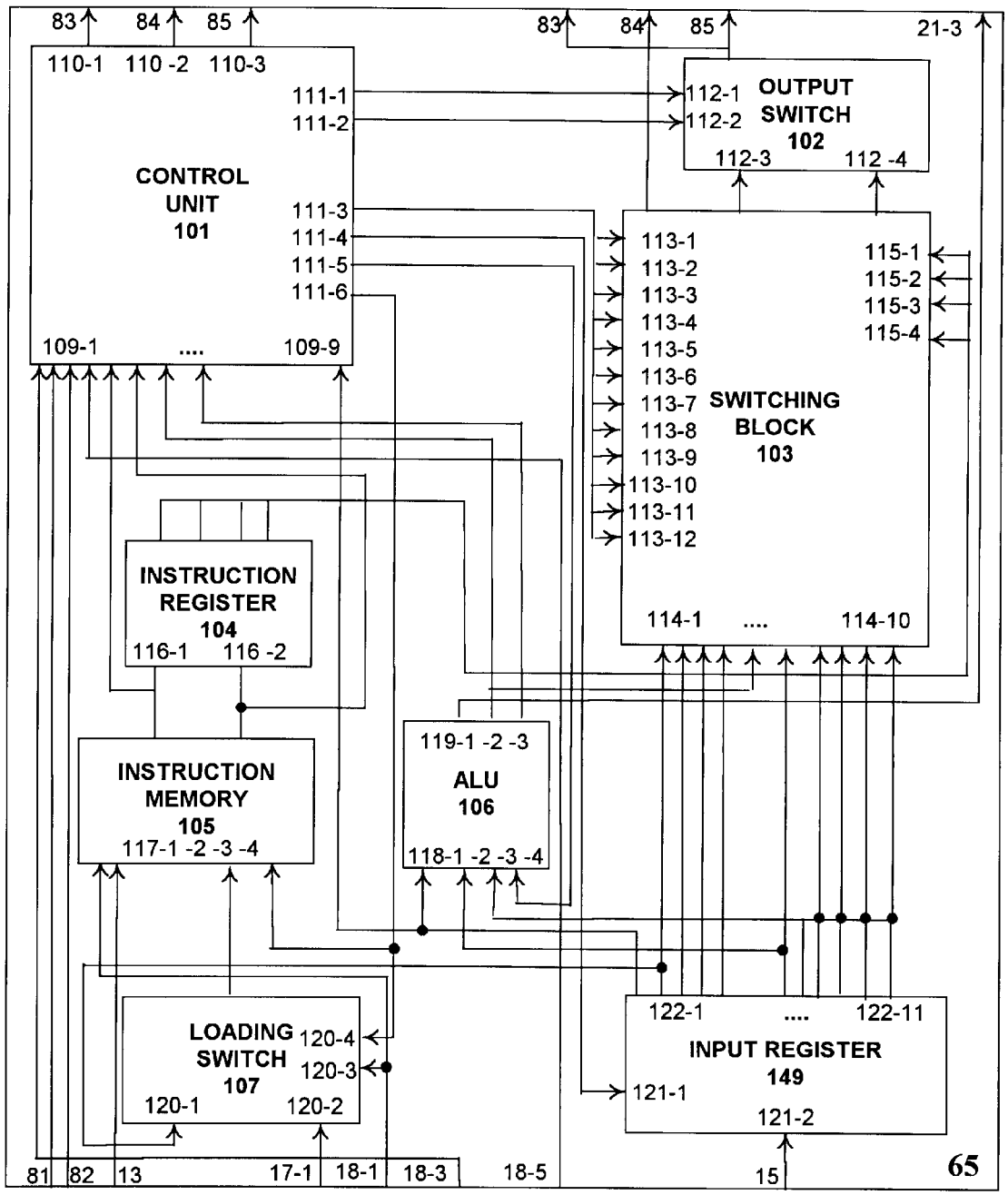
FIG. 5 represents the functional diagram of the executive device for instruction processing.
Figure 7:
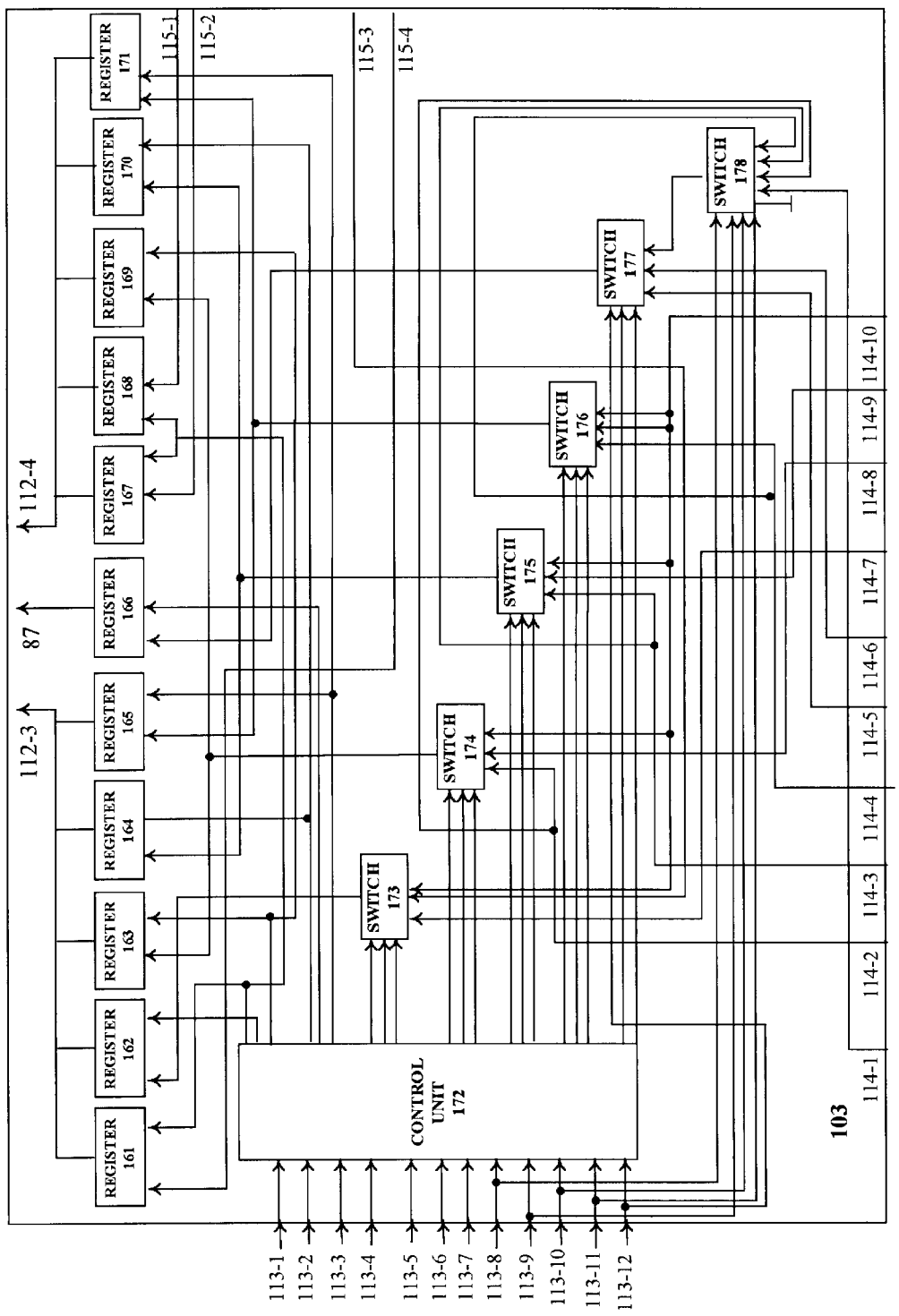
FIG. 7 represents the functional diagram of the switching block of the executive device for instruction processing.

Processing of bit fields in executive device 65, including the determination by the instruction system operations of the functional fields of the status word, are realized in the switching block 103 (FIG. 5,7). The corresponding control signals, which are formed at an output of decoder 137 are transmitted through output 111-3 of control unit 101 to inputs 113-1 . . . 113-12 of switching block 103. In block 103, the control signals of the switching group 173 . . . 178 are formed at outputs 203 . . . 222 of control unit 172 (FIG. 7). The informational inputs of switching block 103 receive the bits of the functional fields of the status word, transmitted from the outputs 122-2 . . . 122-11 of the input register unit 108. The modified fields of the status and data words, formed on the registers 161 . . . 171, are transmitted through the informational outputs of block 103 to the inputs 112-3 and 112-4 of the output switch 102, and from the output of switch 102 to the address and the second informational outputs 86 and 88 of the executive device 65.

In addition to the operations of modification of functional fields, executive device 65 also carries out the operations of relations determination (e.g., between the data values of two inputs of an instruction or between the values of separate functional bit groups). Such operations are run in ALU 106.

As for the rest, the working of the functional units of the executive device 65 is similar to the working of the corresponding units of the executive device 66. The corresponding control and informational outputs 19-4, 21-4 and 21-5, 19-1, 21-1 and 21-2 of the k-th processor unit are the place for forming the transmission strobes and the bits of the result packet functional fields, which realize the beginning of the ensuing computing cycle. Each processor unit processes the instructions without mutual synchronization with any of the other (N-l) processor units.

Thus, the described computer system provides a high performance by means of increasing the load of the processor units and obtaining in this way a decrease of the working programs running time. Then, a high parallelism of the processor units' working is obtained automatically and there is no need to distribute the group parallel processes between separate computational structures (executive devices) inside every running program, or between programs, which is usually carried out by a person, who may become unable to cope with this problem when the number of parallel computing structures increases.

What is claimed is:

1. A computing system containing the switch (2) and N processor units (1-1 . . . 1-N) the second informational output (11) and the third informational input (8); the first control outputs (19-1) and address outputs (20) of the i-th processor unit (1-i) (i=1 . . . N) are connected correspondingly with the i-th input (54-i) of the first group of control inputs and with the i-th input (55-i) of the group of the switch address inputs; the first (21-1) and the second (21-2) informational outputs of the i-th processor unit (1-i) are connected with the corresponding i-th input (57-i) of the group of the switch informational inputs; the first informational (13), address (17-1), control (18-1) and the second informational (14), address (17-2), control (18-2) inputs of the i-th processor unit (1-i) are connected with the first (6) and second (7) informational inputs of the system; the first control input (9) of the system is connected with the control input (53) of the switch (2) and with the third control input (18-3) of the i-th processor unit (1-i); the control output (58) of the switch (2) is connected with the fourth control input (18-4) of the i-th processor unit (1-i); the third informational output (21-3) of the i-th processor unit (1-i) is connected with the first informational output (10) of the system; the computer system is characterized by the fact that there are introduced the auxiliary switch (3), N modules (4-1 . . . 4-N) of associative memory and the buffering block (5); the first control (30-1-i), first informational (30-2-i), second control (30-3-i) and second informational (30-4-i) outputs of the i-th group of exchange outputs of the auxiliary switch (3) are connected correspondingly with the fifth control (18-5), third informational (15), sixth control (18-6) and fourth informational (16) inputs of the i-th processor unit(1-i); the first group of control outputs (28-1 . . . 28-N) of the auxiliary switch (3) is connected with the first group of control inputs (32-1 . . . 32-N) of the buffering block (5); the second group of control outputs (29-1 . . . 29-N) of the auxiliary switch (3) is connected with the second group of control inputs (33-1 . . . 33-N) of the buffering block (5); the control input (22) of the auxiliary switch (3) and the control input (31) of the buffering block (5) and the first control input 46 of each module (4-1 . . . 4-N) of associative memory are connected with the control input (9) of the system; the i-th inputs of the first (23-1 . . . 23-N) and second (24-1 . . . 24-N) groups of control inputs of the auxiliary switch (3) are connected correspondingly with the second (19-2) and third (19-3) control outputs of the i-th processor unit (1-i); the seventh (18-7) and eighth (18-8) control inputs of the i-th processor unit are connected correspondingly with the i-th outputs of the first (39-1 . . . 39-N) and second (40-1 . . . 40-N) groups control outputs of the buffering block (5); the third group of control outputs (41-1 . . . 41-N) and the first group of the informational outputs (42-1 . . . 42-N) of the buffering block are connected correspondingly with the third group of control inputs (25-1 . . . 25-N) and the first group of informational inputs (27-1-1 . . . 27-1-N) of the auxiliary switch (3); the second group of informational outputs (43-1 . . . 43-N) of the buffering block is connected with the second informational output (11) of the system; the fourth group of control inputs (26-1 . . . 26-N) of the auxiliary switch (3) is connected with the fourth group of control outputs (44-1 . . . 44-N) of the buffering block (5); the i-th input of the first group of the informational inputs (34-1 . . . 34-N) of the buffering block is connected with the fourth (21-4) and fifth (21-5) informational outputs of the i-th processor unit (1-i); the fourth control output (19-4) of i-th processor unit is connected with the i-th input of the third group of control inputs (35-1 . . . 35-N) of the buffering block (5); the third group of informational outputs (45-1 . . . 45-N) of the buffering block is connected with the second group of informational inputs (27-2-1 . . . 27-2-N) of the auxiliary switch(3); the first control output (50) of the i-th module (4-i) of associative memory is connected with the i-th input of the second group of control inputs (56-1 . . . 56-N) of the switch (2); the i-th output of the group of informational outputs (59-1 . . . 59-N) of the switch is connected with the informational input (48) of the i-th module (4-i) of the associative memory; the informational (51) and the second control (52) outputs of the i-th module of the associative memory are connected with the i-th inputs of the second group of informational inputs (36-1 . . . 36-N) and the fourth group of control inputs (37-1 . . . 37-N) of the buffering block (5); the third group of informational inputs (38-1 . . . 38-N) of the buffering block is connected with the third informational input (8) of the system; and, the i-th output of the group of control outputs (60-1 . . . 60-N) of the switch (2) is connected with the second control input (49) of the i-th module (4-i) of the associative memory.

2. A computing system according to claim 1 characterized by the fact that each processor unit (1-i) contains the first

(61) and the second (62) switches, the first (63) and the second (64) units of control, the executive device for instruction processing (65) and the executive device for the operand processing (66); the first (67-1) and second (67-2) control inputs of the first switch (61) are connected with the first (75-1) and second (75-2) control outputs of the first unit of control (63); the third control output (76-1) of the first unit of control is connected with the first control input (81) of the executive device for instruction processing (65); the first (79-2) and the second (79-2) control outputs of the second unit of control (64) are connected with the first (70-1) and second (70-2) control inputs of the second switch (62); the first informational input (71-1) of the second switch is connected with the address output (86) of the executive device for the instruction processing (65), the first informational output (87) of the executive device for instruction processing is connected with the second informational input (71-2) of the second switch (62) and the first informational input (68-1) of the first switch (61); the second informational output (88) of the executive device for instruction processing is connected with the second informational input (68-2) of the first switch (61) and the third informational input (71-3) of the second switch (62); the first control output (83) of the executive device for instruction processing is connected with the first control input (73) of the first unit of control (63); the fourth control output (76-2) of the first unit of control (63) is connected with the first control input (89) of the executive device for operand processing (66); the first control output (91) of the executive device for operand processing (66) is connected with the second control input (74) of the first unit of control (63); the first control input (77) of the second unit of control (64) is connected with the second control output (92) of the executive device for the operand processing (66); the second control output (84) of the executive device for the instruction processing (65) is connected with the second control input (78) of the second unit of control (64); the second control input (82) of the executive device for the instruction processing (65) is connected with the third control output (80-1) of the second unit of control (64); the fourth control output (80-2) of the second unit of control is connected with the second control input (90) of the executive device for the operand processing (66); the fourth informational input (72-1) of the second switch (62) is connected with the address output (94) of the executive device for the operand processing (66), the first informational output (95) of the executive device for operand processing is connected with the fifth informational input (72-2) of the second switch and the third informational input (69-1) of the first switch; the second informational output (96) of the executive device for operand processing is connected with the fourth informational input (69-2) of the first switch and with the sixth informational input (72-3) of the second switch; the first, second and third informational outputs of the second switch are the address output (20), the first informational output (21-1) and second informational output (21-2) of the processor unit respectively; the third informational outputs of the executive device for the instruction processing (65) and of the executive device for the operand processing (66) are connected with the third informational output (21-3) of the processor unit; the fourth (21-4) and fifth (21-5) informational outputs of the processor unit are respectively the first and second informational outputs of the first switch (61); the fifth control output of the second unit of control (64) is connected with the first control output (19-1) of the processor unit; the second (19-2) and third (19-3) control outputs of the processor unit are the third control outputs (85) and (93) of the executive device for the instruction processing and of the executive device for the operand processing respectively; the fourth control output (19-4) of the processor unit is connected with the fifth control output of the first unit of control (63); the first informational 13, address 17-1 and control 18-1 inputs of the processor unit are the first informational, address and the third control inputs of the executive device for the instruction processing (65) respectively; the second informational (14), address (17-2) and control (18-2) inputs of the processor unit are connected correspondingly with the first informational, address and the third control inputs of the executive device for the operand processing (66); the fourth control input of the executive device for the operand processing and the fourth control input of the executive device for the instruction processing are connected with the third control input 18-3 of the processor unit; the fourth control input (18-4) of the processor unit is connected with the third control input of the second unit of control (64); the third informational input (15) of the processor unit is the second informational input of the executive device for the instruction processing (65); the fifth control input of the executive device for the instruction processing is the fifth control input (18-5) of the processor unit; the fourth informational (16) and the sixth control (18-6) inputs of the processor unit are connected with the second informational and the fifth control inputs of the executive device for the operand processing (66) respectively; and, the seventh (18-7) and eighth (18-8) control inputs of the processor unit are connected with the third and fourth control inputs of the first unit of control (63) respectively.

3. A computing system according to claim 1 characterized by the fact that the auxiliary switch (3), contains the first (262-1) and the second (262-2) units of control and the first (263-1) and the second (263-2) units of switching; the first groups (268-1 . . . 268-N) of the control outputs of the first (262-1) and second (262-2) units of control are connected with the first (281 . . . 28-N) and second (29-1 . . . 29-N) groups of the control outputs of the auxiliary switch (3) respectively; the first (30-1-i) and second (30-3-i) control outputs of the i-th group of exchange outputs of the auxiliary switch are connected with the i-th outputs 269-i of the second group of the control outputs (269-1 . . . 269-N) of the first (262-1) and second (262-2) units of control respectively; the control inputs (264) of the first and second units of control are connected with the control input (22) of the auxiliary switch (3); the first (27-1-1 . . . 27-1-N) and second (27-2-1 . . . 27-2-N) groups of the informational inputs of the auxiliary switch are connected with the groups of the informational inputs (274-1 . . . 274-N) of the first (263-1) and second (263-2) units of switching respectively; the i-th outputs of the group of the informational outputs (275-1 . . . 275-N) of the first and second units of switching are connected correspondingly with the first (30-2-i) and second (30-4-i) informational outputs of the i-th group of the exchange outputs of the auxiliary switch (3); the first (23-1 . . . 23-N) and second (24-1 . . . 24-N) groups of the control inputs of the auxiliary switch are connected with the first groups of the control inputs (265-1 . . . 265-N) of the first (262-1) and second (262-2) units of control respectively; the groups of the control outputs (276-1 . . . 276-N) of the first (263-1) and second (263-2) units of switching are connected correspondingly with the second groups (266-1 . . . 266-N) of the control inputs of the first (262-1) and the second (262-2) units of control; the third groups (267-1 . . . 267-N) of the control inputs of the first and the second units of control are connected correspondingly with the third (25-1 . . . 25-N) and fourth (26-1 . . . 26-N) groups of the control inputs of the auxiliary switch (3); and, the third groups of the control outputs (270-1-1 . . . 270-N-N) of the first (262-1) and second (262-2) units of control are connected with the first groups 272-i-j of the control inputs (272-1-1 . . . 272-N-N) of the first (263-1) and second (263-2) units of switching respectively; the second group of the control inputs (273-1 . . . 273-N) of each of these units is connected correspondingly with the fourth group of the control outputs (271-1 . . . 271-N) of the first (262-1) and second (262-2) units of control.

4. A computing system according to claim 1 characterized by the fact that the buffering block (5), contains the group of the buffering units (348-1 . . . 348-N); the first (349-1), second (349-2) and third (349-3) control outputs of the i-th buffering unit (348-i) are connected with the i-th outputs of the first (39-1 . . . 39-N), second (40-1 . . . 40-N) and third (41-1 . . . 41-N) groups of the control outputs of the buffering block (5) respectively; the i-th inputs of the first (32-1 . . . 32-N) and second (33-1 . . . 33-N) groups of the control inputs of the buffering block are connected with the first and second control inputs of the i-th (348-i) buffering unit respectively; the fourth control output (349-4) of the buffering unit is connected with the i-th output (44-i) of the fourth group of the control outputs (44-1 . . . 44-N) of the buffering block; the control input (31) of the buffering block is connected with the third control input of each of the buffering units (348-1 . . . 348-N); the i-th inputs of the third (35-1 . . . 35-N) and fourth (37-1 . . . 37-N) groups of the control inputs of the buffering block (5) are connected with the fourth and fifth control inputs of the i-th buffering unit (348-i) respectively; the first (349-5), second (349-6) and third (349-7) informational outputs of the buffering units are connected correspondingly with the i-th outputs of the first (42-1 . . . 42-N), second (43-1 . . . 43-N), and third (45-1 . . . 45-N) groups of the informational outputs of the buffering block (5); the i-th inputs of the first (34-1 . . . 34-N), second (36-1 . . . 36-N) and third (38-1 . . . 38-N) groups of the informational inputs of the buffering block are connected with the first, second and third informational inputs of the i-th buffering unit (348-i) respectively.

* * * * *